(12) United States Patent
Lida et al.

(10) Patent No.: US 9,685,991 B2
(45) Date of Patent: *Jun. 20, 2017

(54) REDUCING TRANSMISSION RATE TO SUPPORT FAST CONVERGENCE

(71) Applicant: Valens Semiconductor Ltd., Hod Hasharon (IL)

(72) Inventors: Eyran Lida, Kfar Ha-Oranim (IL); Aviv Salamon, Raanana (IL); Gaby Gur Cohen, Tel-Mond (IL); Israel Greiss, Raanana (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,961

(22) Filed: Jun. 1, 2016

(65) Prior Publication Data

US 2016/0277067 A1    Sep. 22, 2016

Related U.S. Application Data

(63) Continuation-in-part of application No. 15/006,049, filed on Jan. 25, 2016.

(60) Provisional application No. 62/317,509, filed on Apr. 2, 2016, provisional application No. 62/107,483, filed
(Continued)

(51) Int. Cl.
| | |
|---|---|
| *H04J 1/16* | (2006.01) |
| *H04L 1/00* | (2006.01) |
| *H04B 1/74* | (2006.01) |
| *H04B 1/04* | (2006.01) |

(Continued)

(52) U.S. Cl.
CPC ............. *H04B 1/74* (2013.01); *H04B 1/0475* (2013.01); *H04L 25/03885* (2013.01); *H04L 47/25* (2013.01)

(58) Field of Classification Search
CPC ... H04B 1/74; H04B 1/0475; H04L 25/03885; H04L 47/25
See application file for complete search history.

(56) References Cited

U.S. PATENT DOCUMENTS

| | | | |
|---|---|---|---|
| 5,283,811 A | | 2/1994 | Chennakeshu et al. |
| 5,473,321 A | * | 12/1995 | Goodman ............... E21B 47/12 175/40 |
| 5,559,967 A | | 9/1996 | Oprescu et al. |

(Continued)

OTHER PUBLICATIONS

International search report, PCT/IB2016/050365, May 11, 2016.
Written opinion of the international searching authority, PCT/IB2016/050365, May 11, 2016.

*Primary Examiner* — Maharishi Khirodhar
(74) *Attorney, Agent, or Firm* — Active Knowledge Ltd.

(57) ABSTRACT

Methods and systems for fast recovery from serious differential interferences. An exemplary method includes the following steps: transmitting, by a transmitter to a transceiver, at a fixed data rate above 100 Mbps; receiving, by a receiver from the transceiver, an indication indicating that the transceiver is experiencing a serious interference; responsive to the indication, reducing the data rate at which the transmitter transmits; storing excess data that could not be sent during the period of the reduced data rate; and increasing, within less than 1 millisecond, the data rate at which the transmitter transmits to a level that enables it to transmit both the stored excess data and the ongoing data at the fixed data rate.

26 Claims, 9 Drawing Sheets

Related U.S. Application Data on Jan. 25, 2015, provisional application No. 62/286,930, filed on Jan. 25, 2016.

(51) Int. Cl.
*H04L 12/825* (2013.01)
*H04L 25/03* (2006.01)

(56) References Cited

U.S. PATENT DOCUMENTS

| | | | |
|---|---|---|---|
| 5,675,612 A | 10/1997 | Solve et al. | |
| 5,742,642 A | 4/1998 | Fertner | |
| 5,784,387 A | 7/1998 | Widmer | |
| 6,097,767 A * | 8/2000 | Lo | H04B 3/145 375/232 |
| 6,154,489 A | 11/2000 | Kleider et al. | |
| 6,734,920 B2 | 5/2004 | Ghosh et al. | |
| 6,735,260 B1 | 5/2004 | Eliezer et al. | |
| 6,757,367 B1 | 6/2004 | Nicol | |
| 6,897,712 B2 | 5/2005 | Ficken et al. | |
| 6,897,793 B1 | 5/2005 | Kim et al. | |
| 6,940,973 B1 | 9/2005 | Yeap et al. | |
| 6,985,492 B1 | 1/2006 | Thi et al. | |
| 7,003,094 B2 | 2/2006 | Fischer et al. | |
| 7,136,422 B2 | 11/2006 | Segal et al. | |
| 7,180,963 B2 | 2/2007 | Wang et al. | |
| 7,342,952 B2 | 3/2008 | Smee et al. | |
| 7,999,622 B2 | 8/2011 | Galton et al. | |
| 8,203,975 B1 | 6/2012 | Chen et al. | |
| 8,279,976 B2 | 10/2012 | Lin et al. | |
| 8,284,007 B1 | 10/2012 | Langner et al. | |
| 8,381,055 B2 | 2/2013 | Christiaens et al. | |
| 8,442,099 B1 | 5/2013 | Sederat | |
| 8,472,532 B2 | 6/2013 | Schley-May et al. | |
| 8,514,951 B2 | 8/2013 | Tavassoli Kilani et al. | |
| 8,861,663 B1 | 10/2014 | Sedarat et al. | |
| 8,983,000 B2 | 3/2015 | Senst et al. | |
| 2005/0053229 A1 | 3/2005 | Tsatsanis et al. | |
| 2006/0044030 A1 | 3/2006 | Baez et al. | |
| 2007/0237270 A1 | 10/2007 | Mezer et al. | |
| 2011/0268258 A1 | 11/2011 | Alloin et al. | |
| 2012/0163443 A1 | 6/2012 | Cookman et al. | |
| 2013/0155953 A1 * | 6/2013 | Chu | H04W 28/20 370/328 |
| 2013/0243049 A1 | 9/2013 | Krinsky et al. | |
| 2014/0112379 A1 | 4/2014 | Biyani et al. | |
| 2014/0301498 A1 | 10/2014 | Rimini et al. | |
| 2015/0085914 A1 | 3/2015 | Kizer et al. | |

\* cited by examiner

REDUCING TRANSMISSION RATE TO SUPPORT FAST CONVERGENCE

CROSS-REFERENCE TO RELATED APPLICATIONS

This application is a Continuation-In-Part of U.S. application Ser. No. 15/006,049, filed Jan. 25, 2016, which claims the benefit of U.S. Provisional Patent Application Ser. No. 62/107,483, filed on Jan. 25, 2015. This application also claims the benefit of U.S. Provisional Patent Application Ser. No. 62/286,930, filed on Jan. 25, 2016, and claims the benefit of U.S. Provisional Patent Application Ser. No. 62/317,509, filed on Apr. 2, 2016.

BACKGROUND

Recovering fast from mode-conversion interference is a complicated task that has not been solved yet by the prior art. Although the presence of common mode currents on a differential signaling link does not inherently degrade the integrity of the differential signaling, when energy is transferred from a common mode to a differential mode the common mode current can become a dominant interference signal, in a phenomenon known as mode-conversion or mode coupling.

Mode conversion can cause significant performance degradation. While internal interference sources are usually known to the link partners and can be mitigated effectively with cancellers and equalizers, the mode conversion interference is unknown until it occurs, and thus presents difficulties for achieving the desired performance of high bandwidth communication systems. Examples of such internal interference sources known to the link partners include intersymbol interference (ISI), echo, far end crosstalk (FEXT), and near end crosstalk (NEXT).

SUMMARY

In one embodiment, a first transceiver configured to assist a second transceiver to recover rapidly from a serious interference. The first transceiver includes a receiver, a transmitter, and a buffer. The transmitter is configured to transmit data to the second transceiver, over a differential communication channel, at a fixed data rate above 100 Mbps. The receiver is configured to receive from the second transceiver an indication indicating that the second transceiver is experiencing a serious interference. Responsive to receiving the indication, the transmitter is configured to reduce the data rate at which it transmits data to the second transceiver; whereby reducing the data rate improves the signal to noise ratio at the second transceiver, which enables the second transceiver to recover from the serious interference within less than 1 millisecond. The buffer is configured to store excess data that could not be transmitted by the transmitter while the data rate was reduced. And the transmitter is further configured to increase its data rate to a level that enables it to transmit, within less than 1 millisecond from the moment of reducing the data rate, both the stored excess data and the ongoing data at the fixed data rate.

In another embodiment, a method for rapidly recovering from a serious interference includes the following steps: transmitting, by a transmitter to a transceiver over a differential communication channel, at a fixed data rate above 100 Mbps; receiving, by a receiver from the transceiver, an indication indicating that the transceiver is experiencing a serious interference; responsive to the indication, reducing the data rate at which the transmitter transmits; wherein the reduced data rate improves the signal to noise ratio at the transceiver, which enables the transceiver to recover from the serious interference within less than 1 millisecond; storing excess data that could not be sent during the period of the reduced data rate; and increasing the data rate, at which the transmitter transmits, to a level that enables it to transmit, within less than 1 millisecond from the moment of reducing the data rate, both the stored excess data and the ongoing data at the fixed data rate.

In still another embodiment, a transceiver configured to utilize dynamic coding for rapid recovery. The transceiver includes a digital canceller coupled to a receiver analog front end (Rx-AFE) and to a common mode sensor AFE (CMS-AFE) via a fast-adaptive mode-conversion canceller (FA-MCC). The Rx-AFE and CMS-AFE are coupled to a differential communication channel that is coupled to a second transceiver. Responsive to receiving an indication that a serious differential interference has occurred, a rate controller is configured to: command the second transceiver to reduce the code rate of the packets by at least 50%, and update the FA-MCC about the reduction in the code rate. Responsive to being apprised about the reduction, the FA-MCC is configured to increase its adaptation step size (ADSS) by at least 50% in order to mitigate, within less than 1 millisecond, the effect of the serious differential interference. Following mitigation of the effect of the serious differential interference, the rate controller is configured to: command the second transceiver to increase the code rate, and update the FA-MCC about the increase in the code rate. And the FA-MCC is further configured to reduce its ADSS after it mitigates the effect of the serious differential interference.

In still another embodiment, a method for achieving rapid recovery utilizing dynamic coding includes the following steps: responsive to receiving an indication that a first transceiver suffers from a serious differential interference, commanding a second transceiver to reduce, by at least 50%, the code rate of packets sent to the first transceiver; responsive to receiving, by a fast-adaptive mode-conversion canceller (FA-MCC) comprised in the first transceiver, an indication about the reduction in the code rate, increasing the adaptation step size (ADSS) of the FA-MCC by at least 50%; wherein increasing the ADSS enables the FA-MCC to mitigate within less than 1 millisecond the effect of the serious differential interference; following mitigation of the effect of the serious differential interference: commanding the second transceiver to increase the code rate, and updating the FA-MCC about the increase in the code rate; and reducing the ADSS of the FA-MCC after it mitigates the effect of the serious differential interference.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
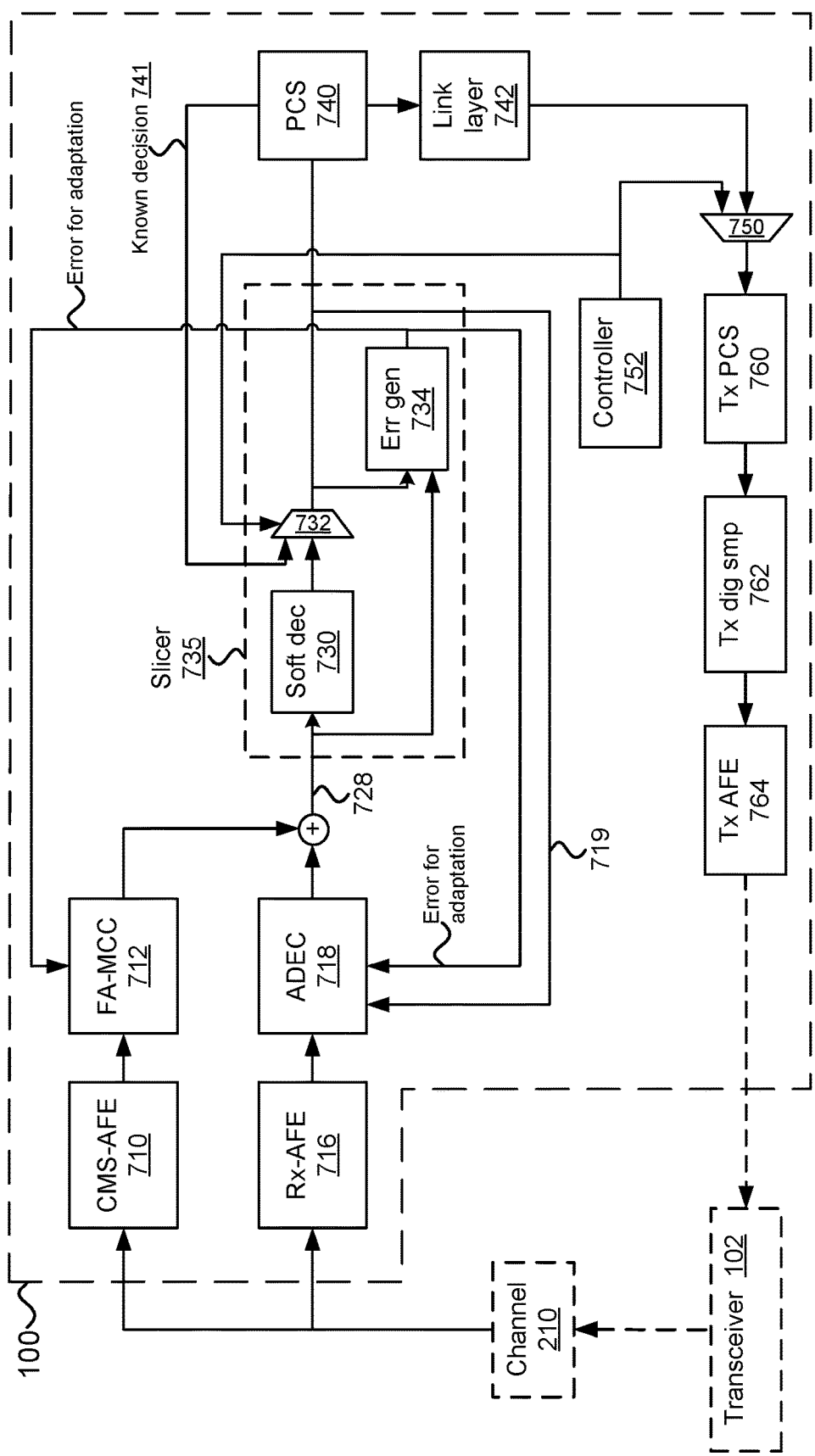
FIG. 1A illustrates one embodiment of a transceiver that converges fast.

FIG. 1A illustrates one embodiment of a transceiver that converges fast. Transceiver 100 includes the following elements: a common mode sensor analog front end (CMS-AFE 710), a fast-adaptive mode-conversion canceller (FA-MCC 712), a receiver analog front end (Rx-AFE 716), an adaptive digital equalizer and canceller (ADEC 718), a slicer 735 (that includes a soft decision element 730, a selector 732, and an error generator 734), a Physical Coding Sublayer (PCS 740), a link layer 742, a controller 752, a selector 750, a transmitter PCS (Tx PCS 760), a transmitter digital sampler (Tx dig smp 762), and a transmitter AFE (Tx AFE 764).

The soft decision 730 makes a decision by slicing the reconstructed representation of the original transmitted signal 728. In one embodiment, when the level of differential interference is too high, which is referred to herein as a serious differential interference (which for brevity may also be referred to herein as "serious interference"), the ability of the soft decision element 730 to make an accurate decision may not be good enough, and/or the convergence time of the transceiver 100 may be too long. Thus, the controller 752 may request the transceiver 102 to transmit known data, and also configures the selector 732 to output the known decision received from the PCS 740 instead of a possibly incorrect decision that is received from the soft decision element 730. As a result of configuring the selector 732 to output the known decision, the error generator 734 is able to generate the correct error based on the reconstructed representation of the original transmitted signal 728 and the known decision 741 received from the PCS 740. The correct error enables the ADEC 718 and FA-MCC 712 to converge fast because their convergence speed is function of the noisiness of the error, and thus receiving the correct error can accelerate their convergence. Using the known decision 741 also reduces the error propagation of the ADEC 718 because the correct decision is fed from selector 732 over line 719 to the ADEC 718. Therefore, having the correct error by injecting the known decision 741 supports fast adaptation, reduces error propagation, and moves the transceiver 100 into a stable state—even when the differential communication channel suffers from a serious differential interference. Examples of transmitting known data include transmitting a sequence based on the idle sequence (such as transmitting the idle sequence itself or a modification of the idle sequence), and/or transmitting a sequence based on the scrambler.

In one embodiment, first and second transceivers that forward time sensitive data at a predetermined average rate and up to a predetermined packet delay variation, include the following elements:

An Rx analog front end (AFE) and a common mode sensor AFE (CMS-AFE) that couple the second transceiver to a differential communication channel coupled to the first transceiver. The differential communication channel is not completely known, and the first and second transceivers are expected to work at a first packet loss rate when there is no serious differential interference. From time to time, the differential communication channel may suffer from serious differential interferences that increase significantly the packet loss rate to a second packet loss rate that is at least ten times the first packet loss rate.

The CMS-AFE extracts a digital representation of a common mode signal of the received differential signal, and forwards it to a fast-adaptive mode-conversion canceller (FA-MCC) that generates a compensation signal to mitigate the differential interference caused by mode-conversion of the common mode signal. Herein mitigation of interference, such as mitigation of the differential interference, involves canceling at least some of the effect of the interference to an extent that enables a communication system to meet its expected performance.

The FA-MCC may utilize a large adaptation step size to mitigate the effect of the serious differential interference fast.

The Rx-AFE extracts the received differential signal and feeds it to an adaptive digital equalizer and canceller (ADEC). The ADEC includes one or more equalizers, such as a Decision Feedback Equalizer (DFE) and/or a Feed-Forward Equalizer (FFE), and one or more cancellers, such as a far end crosstalk (FEXT) canceller.

The FA-MCC and the ADEC reconstruct a representation of the original transmitted signal, and feed the representation of the original transmitted signal to a slicer that feeds the sliced symbols to a Physical Coding Sublayer (PCS). In one example, the original transmitted signal is the signal sent from the first transceiver before shaping.

The PCS extracts a bitstream from the sliced symbols, and feeds a link layer component that parses the sliced symbols into packets. It is noted that the bitstream may include bytestream and other similar equivalents.

The link layer component may include a retransmission module that requests retransmission of packets with errors, and forwards the packets (optionally in the correct order) after receiving the retransmitted packets. It is noted that packets with errors may include missing packets and any other packets that may require retransmission.

This embodiment enables the FA-MCC to converge fast, such that the retransmissions, in response to the serious differential interference, still enable the transceiver to forward packets at the predetermined average rate and within the predetermined packet delay variation.

Figure 1B:
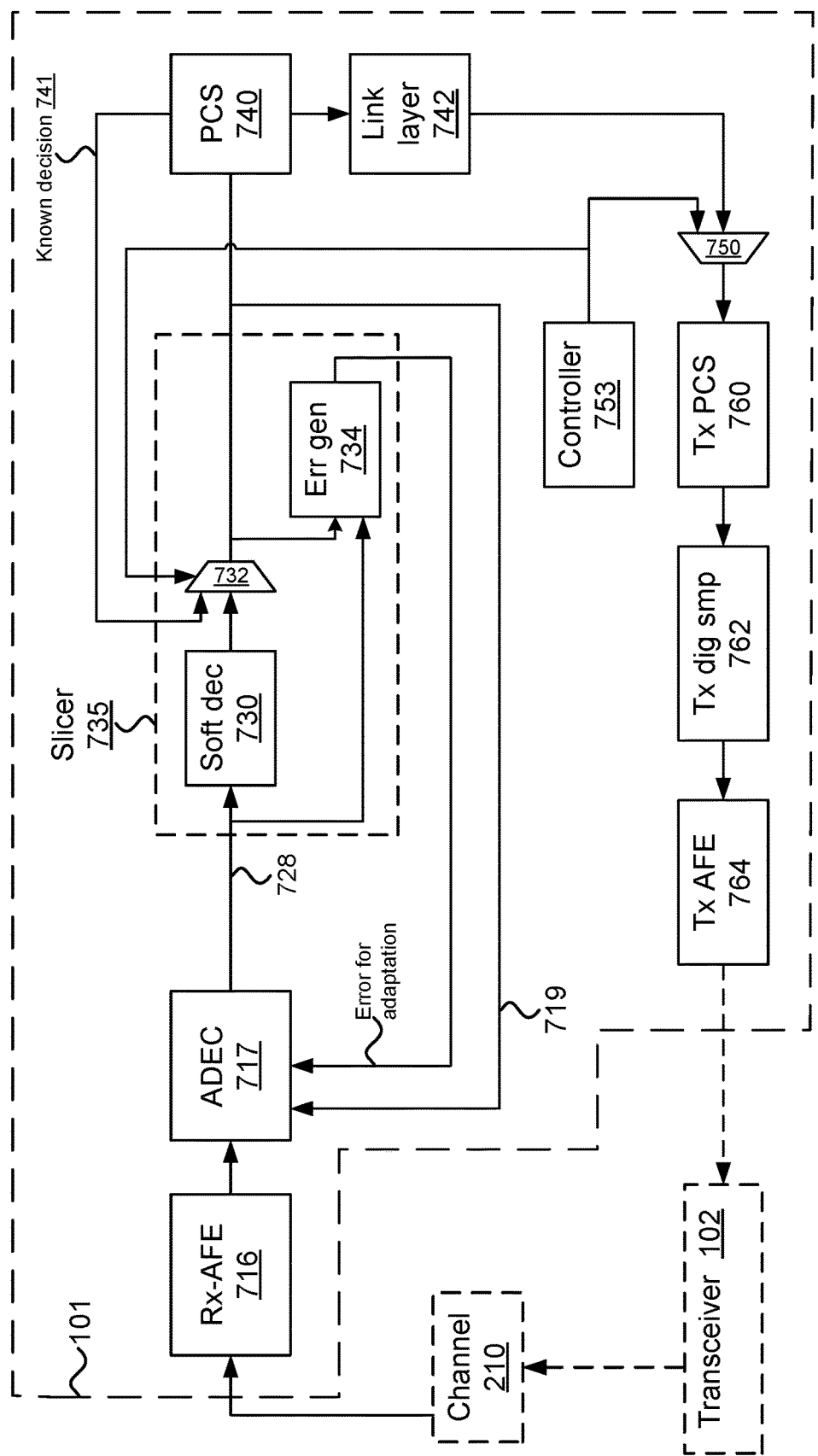
FIG. 1B illustrates an alternative embodiment of a transceiver that converges fast.

FIG. 1B illustrates an alternative embodiment of a transceiver that converges fast. Transceiver 101 does not include an FA-MCC component, although the ADEC 717 may include the functionality of the FA-MCC 712. Controller 753 may be similar to controller 752, with the difference that controller 753 may be designed to operate without the FA-MCC component.

Figure 1C:
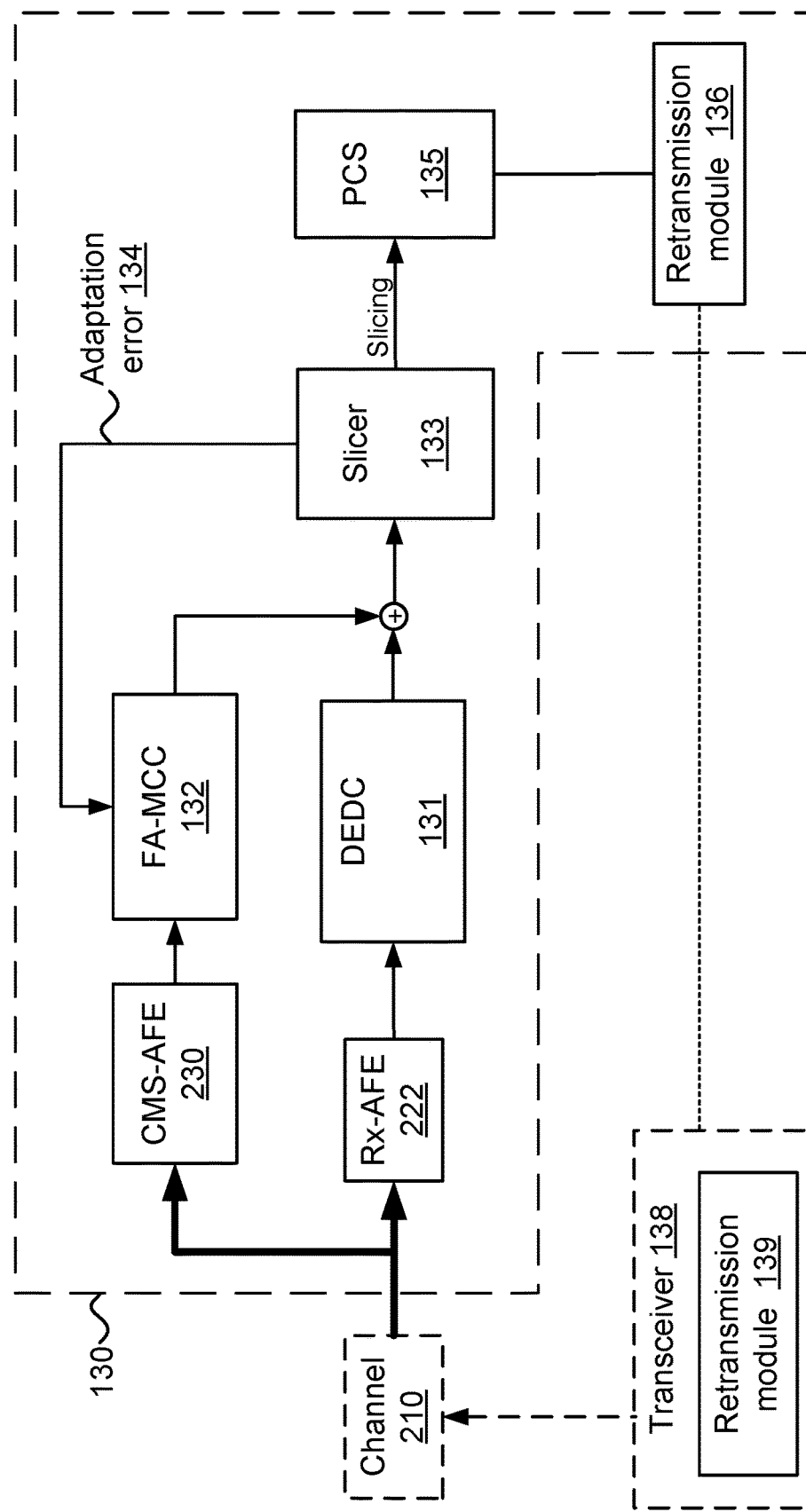
FIG. 1C illustrates one embodiment of a mode-conversion canceller that utilizes known data for fast convergence.

FIG. 1C illustrates one embodiment of a mode-conversion canceller that utilizes known data for fast convergence. The embodiment includes a transceiver 130 that includes the following elements: a receiver analog front end (Rx-AFE 222) and a common mode sensor AFE (CMS-AFE 230) coupled to a differential communication channel 210 that is coupled to a second transceiver 138. The Rx-AFE 222 feeds the received differential signal to a digital equalizer and/or a digital canceller (DEDC 131). The CMS-AFE 230 extracts a digital representation of a common mode signal of a received differential signal, and forwards it to a fast-adaptive mode-conversion canceller (FA-MCC 132) that generates a compensation signal to mitigate differential interference. It is noted that the compensation signal mitigates the differential interference when the compensation signal cancels at least some of the effect of the differential interference to an extent that enables the transceiver to meet its expected performance. For example, if the transceiver is expected to support a throughput of above 200 Mb/s, then the compensation signal mitigates the differential interference when the transceiver is able to support the 200 Mb/s throughput, and does not mitigate the differential interference when the transceiver is unable to support the 200 Mb/s throughput.

Responsive to receiving an indication that a serious differential interference has occurred, the transceiver 130 indicates the second transceiver 138 to transmit known data. The transceiver 130 utilizes the known data to improve the accuracy of its slicing errors (meaning, in some cases, to reduce the slicing errors), which enables rapid adaptation of the FA-MCC 132 to a level that mitigates the serious differential interference to an extent that enables a retransmission module 136 to request retransmission of erred packets fast enough to maintain a fixed rate of data transmission over a 2-millisecond window. In one example, the fixed rate of data transmission refers to less than 2% difference between: (i) a first amount of unique data successfully transmitted over the channel during a first 2-millisecond window that ends 100 microseconds before the occurrence of the serious differential interference, and (ii) a second amount of unique data successfully transmitted over the channel during a second 2-millisecond window adjacent to the first window. In another example, the fixed rate of data transmission refers to less than 1% difference between: (i) a first amount of unique data successfully transmitted over the channel during a first 500 microseconds window that ends 50 microseconds before the occurrence of the serious differential interference, and (ii) a second amount of unique data successfully transmitted over the channel during a second 500 microseconds window adjacent to the first window.

Optionally, the digital equalizer may be an adaptive digital equalizer, the digital canceller may be an adaptive digital canceller, and the DEDC may include both the adaptive digital equalizer and the adaptive digital canceller (ADEC). In this case, the FA-MCC and the ADEC may reconstruct a representation-of-the-original-transmitted-signal (ROS), and feed the ROS to a slicer 133 that feeds a Physical Coding Sublayer (PCS 135) with the sliced symbols. The PCS 135 may extract a bitstream from the sliced symbols, and feed a link layer component that parses the sliced symbols into packets. Optionally the link layer component includes the retransmission module 136.

Usually, the parameters of the differential communication channel are not completely known, and the transceiver 130 operates at a first packet loss rate when there is no serious differential interference. From time to time, the differential communication channel suffers from the serious differential interference, and the serious differential interference increases the packet loss rate of the transceiver 130 to a second packet loss rate that is at least ten times, thousand times, and/or million times the first packet loss rate. Additionally or alternatively, the serious differential interference may be caused by mode-conversion of the common mode signal, and while suffering from an interference considered a serious differential interference, the transceiver does not meet its expected performance.

Optionally, the FA-MCC 132 converges within a short time, such that the retransmissions in response to the serious differential interference still enable the transceiver 130 to forward packets within a packet delay variation below 1 millisecond, or even below 50 microseconds. Additionally, responsive to receiving the indication that the serious differential interference has occurred, the FA-MCC 132 may increase its adaptation step size (ADSS) by at least 50% in order to rapidly mitigate the effect of the serious differential interference. Optionally, after mitigating the effect of the serious differential interference, the FA-MCC 132 may reduce its ADS S.

In one embodiment, a method for fast convergence includes the following steps: In step 1, extracting a digital representation of a common mode signal of a received differential signal sent by a transceiver, and generating, by a fast-adaptive mode-conversion canceller (FA-MCC), a compensation signal to mitigate differential interference. In step 2, feeding the received differential signal to a digital equalizer and/or a digital canceller (DEDC), wherein the FA-MCC and the DEDC feed a slicer. In step 3, responsive to receiving an indication that a serious differential interference has occurred, indicating the transceiver to transmit known data. And in step 4, utilizing the received known data for improving the accuracy of the slicer's errors, which enables rapid adaptation of the FA-MCC to a level that mitigates the serious differential interference and enables requesting retransmission of erred packets fast enough to maintain a fixed rate of data transmission over a 2-millisecond window.

The method may feature various options. Optionally, the fixed rate of data transmission refers to less than 2% difference between: (i) a first amount of unique data successfully transmitted over the channel during a first 2-millisecond window that ends 100 microseconds before the occurrence of the serious differential interference, and (ii) a second amount of unique data successfully transmitted over the channel during a second 2-millisecond window adjacent to the first window. Alternatively, the fixed rate of data transmission refers to less than 1% difference between: (i) a first amount of unique data successfully transmitted over the channel during a first 500 microseconds window that ends 50 microseconds before the occurrence of the serious differential interference, and (ii) a second amount of unique data successfully transmitted over the channel during a second 500 microseconds window adjacent to the first window.

The method may further include the step of working at a first packet loss rate when there is no serious differential interference, and responsive to the occurrence of the serious differential interference, increasing the packet loss rate to a second packet loss rate that is at least ten times the first packet loss rate. Optionally, the FA-MCC may converge within a short time, such that the retransmissions in response to the serious differential interference still enable data transmission within a packet delay variation below 200 microseconds. Optionally, responsive to receiving the indication that the serious differential interference has occurred, the method increases the FA-MCC adaptation step size (ADSS) by at least 50% in order to mitigate the effect of the serious differential interference rapidly. Then, the method may further include the step of reducing the ADSS after the FA-MCC mitigates the effect of the serious differential interference.

Figure 1D:
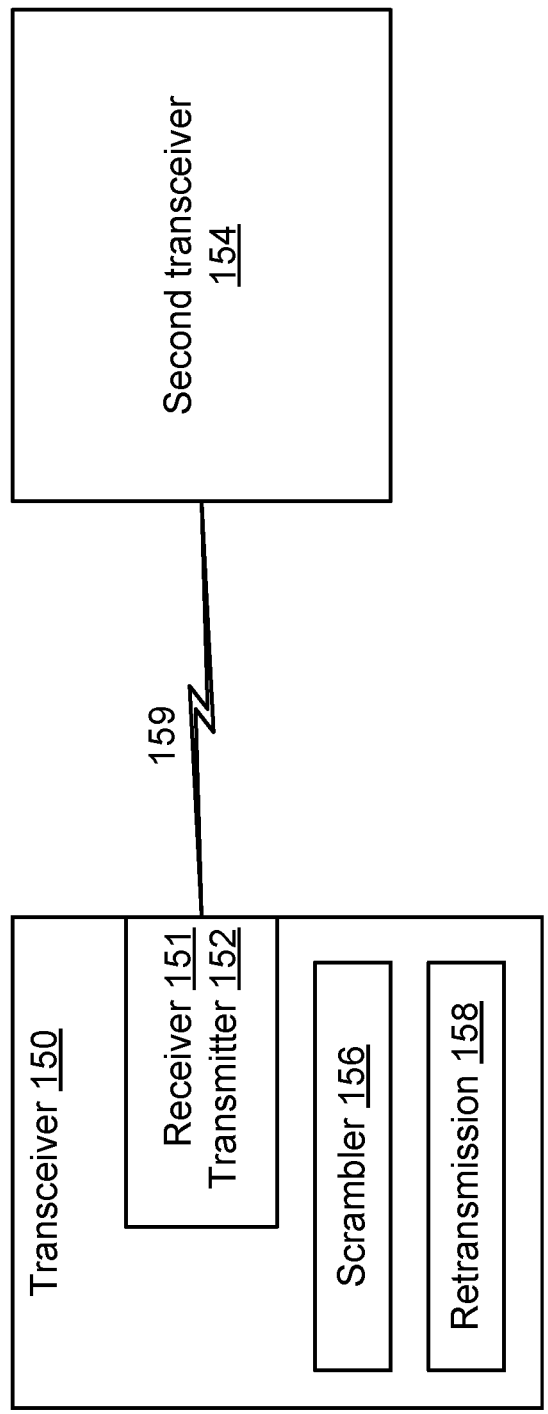
FIG. 1D illustrates one embodiment of a transceiver that assists a second transceiver to recover rapidly from quality degradation.

FIG. 1D illustrates one embodiment of a transceiver 150 that assists a second transceiver 154 to recover rapidly from quality degradation in operating point of the second transceiver 154. The transceiver 150 includes a receiver 151, a transmitter 152, an optional scrambler 156, and an optional retransmission module 158. The receiver 151 receives from the second transceiver 154 an indication to transmit known data, and transmits the known data. The known data is used by the second transceiver 154 to recover within less than 1 millisecond from the quality degradation. Optionally, the known data includes bitwise complement code words of an idle sequence, and each bitwise complement code word appears in the idle sequence. And after transmitting the known data, the transmitter transmits the idle sequence within less than 1 millisecond from the moment of starts transmitting the known data, and before transmitting a data frame.

In one example, the idle sequence may be determined based on a sequence generated by a scrambler of the transceiver. In another example, at least 50% of the known data may be bitwise complement code words of the scrambler 156 of the transceiver 150; in this scenario, the known data may be the bitwise complement code words of the scrambler. The transceiver 150 may further include the retransmission module 158 for transmitting packets that could not be transmitted while the second transceiver 154 has not yet recovered from a mode-conversion of a common mode signal. Optionally, the quality degradation results from a mode-conversion of a common mode signal, and while suffering from the quality degradation the second transceiver does not meet its expected performance.

In one embodiment, a method for rapid recovery from quality degradation in an operating point includes the following steps: In step 1, receiving, by a receiver from a transceiver, an indication to transmit known data; wherein utilizing the known data enables the transceiver to recover within less than 1 millisecond from quality degradation in its operating point. In step 2, transmitting, by a transmitter, the known data; wherein the known data comprises bitwise complement code words of an idle sequence, and each bitwise complement code word appears in the idle sequence. And in step 3, transmitting, by the transmitter, the idle sequence within less than 1 millisecond from start transmitting the known data, and before transmitting a data frame.

The method may further include the step of determining the idle sequence based on a sequence of a scrambler of the transmitter. Additionally or alternatively, the method may further include the step of transmitting packets that could not be transmitted while the transceiver has not yet recovered from a mode-conversion of a common mode signal.

Referring back to FIG. 1A, in one embodiment, a transceiver 100, which recovers rapidly from a mode-conversion of a common mode interference, includes at least the following elements: a common mode sensor analog front end (CMS-AFE 710), a fast-adaptive mode-conversion canceller (FA-MCC 712), and a slicer 735. The slicer generates slicing decisions and slicing errors based on a differential signal, transmitted at a rate above 500 Mbps, which is received from a second transceiver 102. The CMS-AFE 710 senses a common mode component of the differential signal, and is coupled to the FA-MCC 712 that generates a compensation signal that compensates for differential interferences that are correlated with the common mode component. Wherein, within less than 1 millisecond from an occurrence of a differential interference that cause the packet loss rate to exceed 10% as a result of the mode-conversion, the transceiver 100 utilizes the slicing errors to adapt the FA-MCC 712 to a level that reduces the packet loss rate to below 1%.

Optionally, the transceiver 100 further includes a receiver analog front end (Rx-AFE 716) that receives the differential signal, and feeds it to a module that includes an equalizer and/or a canceller. The module generates an equalized signal based on the differential signal.

In one example, after the occurrence of the differential interference that caused the packet loss rate to exceed 10%, the transceiver 100 indicates the second transceiver to reduce the rate of the transmitted data in order to improve its detection rate, which improves the accuracy of the slicing errors (which optionally means to reduce the slicer's errors), which enables the rapid adaptation of the FA-MCC 712 within less than 1 millisecond. In another example, the transceiver 100 is implemented on an integrated circuit having limited resources, and the second transceiver 102 includes a limited-size buffer having capacity sufficient to store all the packets that are transmitted when transmitting at the highest transmission rate for a period lasting no more than 40,000 symbols. In still another example, within less than 100 microseconds from the occurrence of a differential interference that caused the packet loss rate to exceed 50% as a result of the mode-conversion, the transceiver 100 utilizes the slicing errors to adapt the FA-MCC 712 to a level that reduces the packet loss rate to below 1%.

In one embodiment, a method for achieving rapid recovery from a mode-conversion of common mode interference includes the following steps: In step 1, generating, by a slicer, slicing decisions and slicing errors based on a differential signal transmitted at a rate above 500 Mbps, which is received from a transceiver. In step 2, sensing, by a common mode sensor analog front end (CMS-AFE), a common mode component of the differential signal. In step 3, generating, by a fast-adaptive mode-conversion canceller (FA-MCC) coupled to the CMS-AFE, a compensation signal that compensates for differential interferences that are correlated with the common mode component. And in step 4, within less than 1 millisecond from an occurrence of a differential interference, which caused a packet loss rate resulting from the mode-conversion to exceed 10%, utilizing the slicing errors for adapting the FA-MCC to a level that reduces the packet loss rate to below 1%.

Optionally, after the occurrence of the differential interference that caused the packet loss rate to exceed 10%, the method further concludes the step of indicating the second transceiver to reduce the rate of the transmitted data in order to improve the accuracy of the slicing errors, which enables the rapid adaptation of the FA-MCC within less than 1 millisecond. According to another option, utilizing the slicing errors for adapting the FA-MCC to the level that reduces the packet loss rate to below 1% occurs within less than 100 microseconds from the occurrence of the differential interference that caused the packet loss rate to exceed 10%.

Figure 2A:
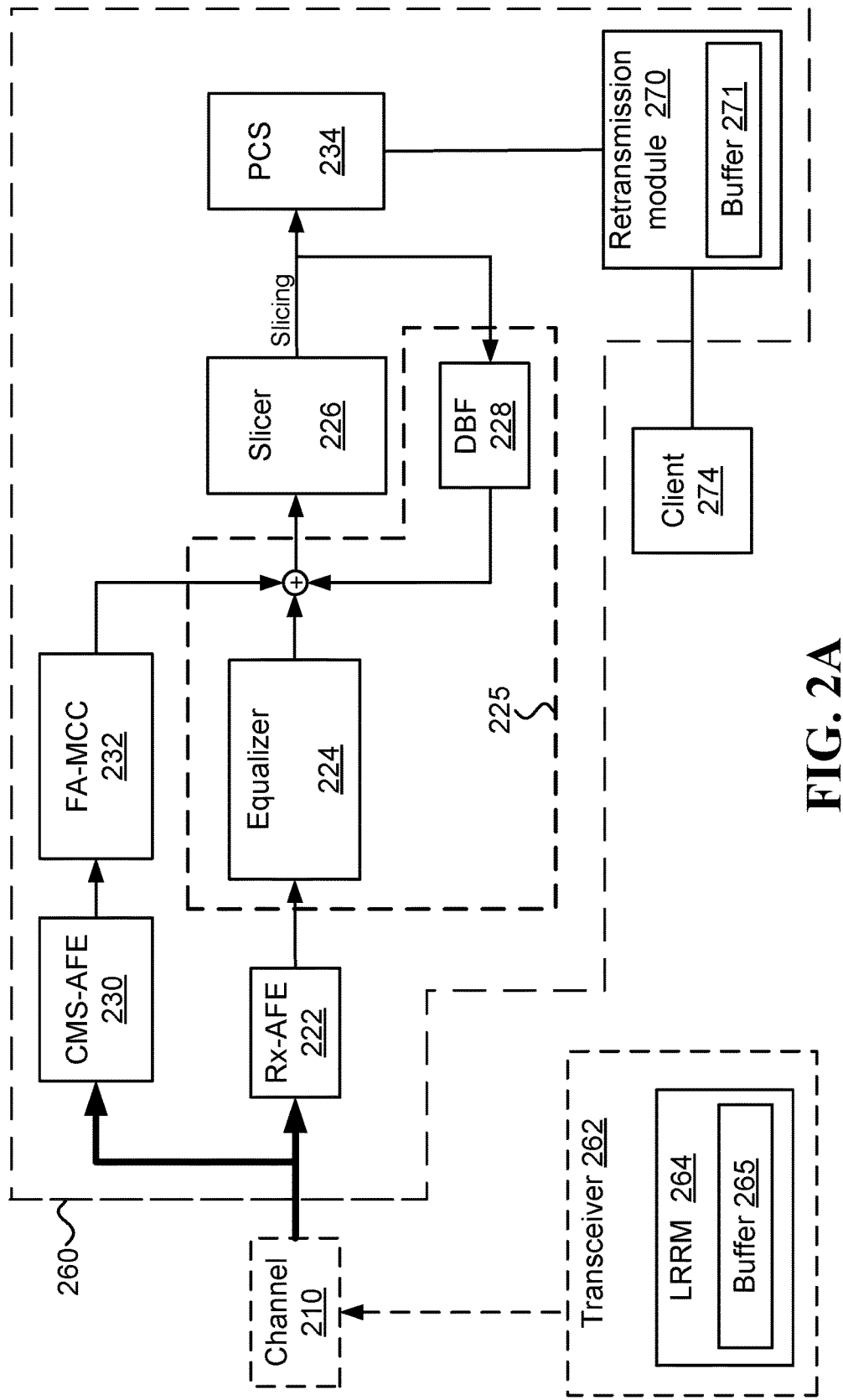
FIG. 2A illustrates one embodiment of a communication system operating over a differential communication channel that may suffer from serious common-mode-to-differential-mode interferences.

FIG. 2A illustrates one embodiment of a communication system that operates over a differential communication channel 210 that is not completely known and may suffer from serious common-mode-to-differential-mode interferences. The communication system transmits data at a rate of above 500 Mbps, and includes at least the following elements: a transceiver 260, a second transceiver 262, a limited resources retransmission module (LRRM 264), and a fast-adaptive mode-conversion canceller (FA-MCC 232). The transceiver 260 is coupled to the second transceiver 262 over a differential communication channel 210. The transceiver 260 is configured to maintain a pre-retransmission packet loss rate below 1% when there is no serious differential interference, whereby, from time to time, the differential communication channel may suffer from serious differential interferences that cause the packet loss rate to exceed 5%. The LRRM 264 stores, for a delayed transmission, a maximum amount of erred packets that are accumulated during less than 1 millisecond at data rate above 500 Mbps. And within less than 1 millisecond from receiving an indication that the serious differential interference has occurred, the FA-MCC 232 mitigates the effect of the serious differential interference, bringing the effect to a level that enables the communication system to successfully transmit data at a rate of above 500 Mbps.

Optionally, the LRRM 264 is implemented on an integrated circuit (IC) having limited resources. Additionally or alternatively, the transceiver 260 comprises a digital canceller 225 coupled to a receiver analog front end (Rx-AFE 222) and to a common mode sensor AFE (CMS-AFE 230); and the Rx-AFE and the CMS-AFE are coupled to the differential communication channel 210 that is not completely known, and the digital canceller may include an equalizer 224 and a Decision-Based Filter (DBF 228). Optionally, the digital canceller 225 feeds a slicer 226 that feeds a Physical Coding Sublayer (PCS 234) with quantization results; the PCS 234 extracts packet data from the quantization results; and the retransmission module 270 receives the packet data, and requests retransmission of packets with errors based on the packet data. Optionally, the data comprises information related to one or more of the following: packet headers, packet payloads, and packet tails.

Optionally, the FA-MCC 232 converges at a short time, such that the retransmissions in response to the serious differential interference still enable the transceiver 260 to forward packets within a predetermined packet delay variation shorter than 500 microseconds, or even within a predetermined packet delay variation shorter than 50 microseconds.

In one example, the FA-MCC 232 is able to mitigate the effect of the serious differential interference within less than 100 microseconds by increasing its adaptation step size (ADSS) by at least 50%. In another example, the FA-MCC 232 is able to mitigate the effect of the serious differential interference within less than 20 microseconds by increasing its adaptation step size (ADSS) by at least 50%.

Optionally, the LRRM 264 stores a maximum amount of erred packets that are accumulated during less than 20 microseconds at the maximum throughput. Additionally or alternatively, the LRRM 264 is implemented on an IC with limited resources that cannot support retransmission of more than 100% of the packets received during the time it takes the FA-MCC to mitigate the effect of the serious differential interference. Optionally, the LRRM 264 further includes a buffer 265 with a capacity that is sufficient to store the received packets until all packets are received successfully. Alternatively, the LRRM 264 further comprises a buffer 265 with a capacity that is limited to store all the packets that are received during up to 20 microseconds while the packet loss rate is above 5%.

Optionally, the FA-MCC 232 does not converge optimally, and does not reach an optimal solution even after 1 second. Additionally or alternatively, the FA-MCC 232 reduces its adaptation step size by at least 50% within 1 second from the time the LRRM 264 finishes retransmitting packets with errors that were lost during the time it took the FA-MCC 232 to mitigate the effect of the serious differential interference.

In one embodiment, a method for rapid mitigation of serious differential interferences includes the following steps: In step 1, transmitting data at a rate above 500 Mbps from a second transceiver to a first transceiver over a differential communication channel. The first transceiver maintains a pre-retransmission packet loss rate below 1% when there is no serious differential interference, and from time to time, the differential communication channel may suffer from serious differential interferences that cause the packet loss rate to grow and exceed 5%. In step 2, storing and retransmitting a maximum amount of erred packets that are accumulated during less than 1 millisecond while being transmitted at a data rate above 500 Mbps. And in step 3, within less than 1 millisecond from receiving an indication that the serious differential interference has occurred, mitigating the effect of the serious differential interference utilizing a fast-adaptive mode-conversion canceller (FA-MCC). Optionally, this brings the effect of the serious differential interference to a level that enables the second transceiver to successfully transmit data at a rate that is at least 500 Mbps.

In one example, the serious differential interferences may cause the packet loss rate to exceed 20%, and the method described above further includes the step of converging the FA-MCC within a short time, such that the retransmissions in response to a serious differential interference still enable the transceiver to forward packets with a delay variation that is shorter than 100 microseconds. Additionally or alternatively, the method may further include the step of mitigating the effect of the serious differential interference, by utilizing the FA-MCC, within less than 100 microseconds, by increasing the adaptation step size (ADSS) of the FA-MCC by at least 50%. Additionally or alternatively, the method may further include a step of reducing the adaptation step size of the FA-MCC by at least 50% within 1 second from the time the LRRM 264 finishes retransmitting packets with errors that were lost during the time it took the FA-MCC to mitigate the effect of the serious differential interference.

Figure 2B:
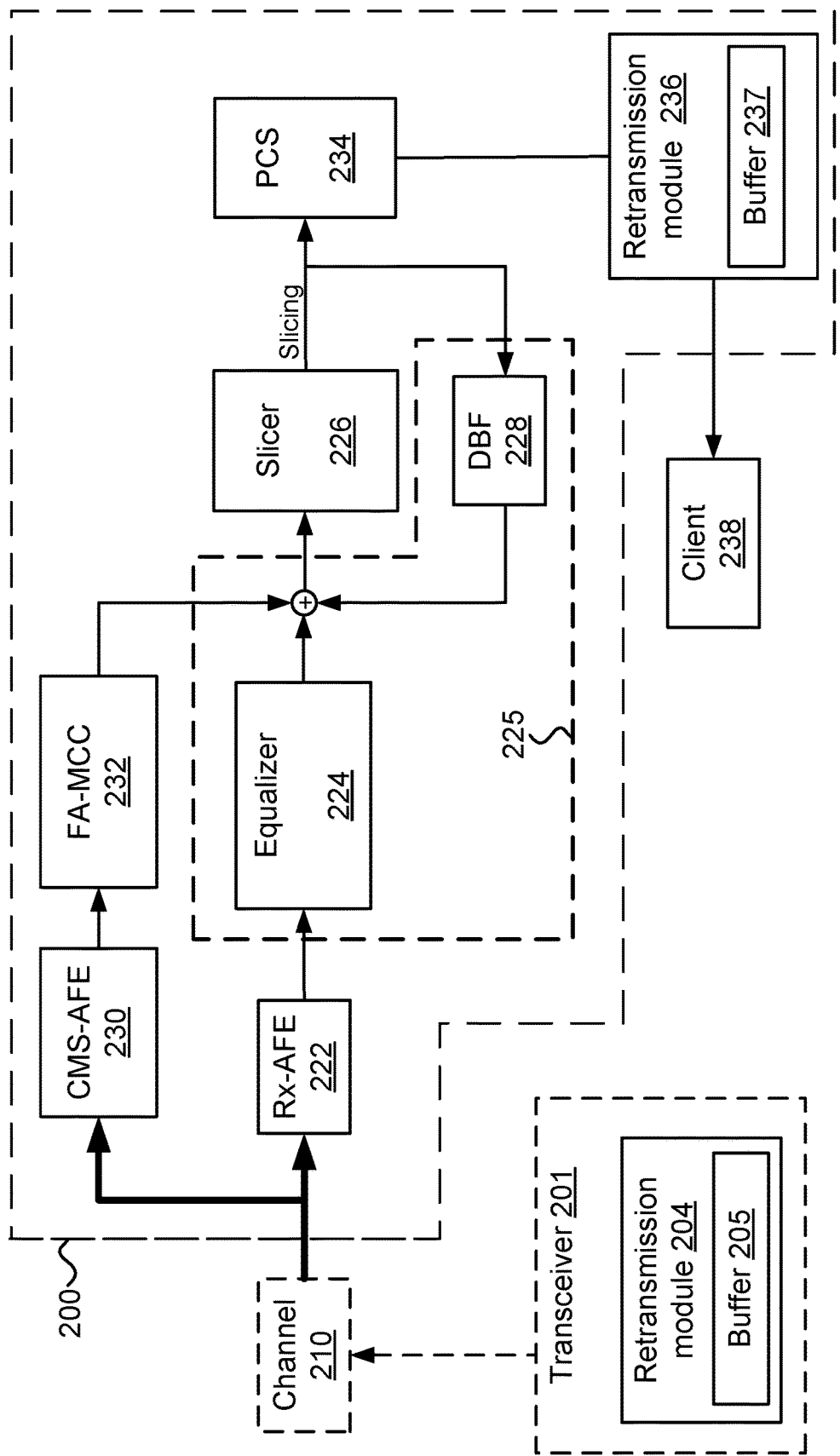
FIG. 2B illustrates another embodiment of a communication system operating over a differential communication channel that may suffer from serious common-mode-to-differential-mode interferences.

FIG. 2B illustrates one embodiment of a communication system operating over a differential communication channel that is not completely known and may suffer from serious common-mode-to-differential-mode interferences (that in some cases may be referred to, in short, as "serious differential interferences" and/or "serious interferences"). The communication system includes a first transceiver 200 and a second transceiver 201, capable of communicating at a high throughput, with communication rates possibly exceeding 120 Mbps, 1.2 Gbps, or 10 Gbps.

The communication system is implemented, at least in part, on one or more Integrated Circuits (ICs) having limited resources. The communication system further implements a retransmission module on the ICs. In one embodiment, the second transceiver 201 utilizes a retransmission module 204 that uses a buffer 205 to store packets that may have to be retransmitted. In one embodiment, the first transceiver 200 utilizes a retransmission module 236 that uses a buffer 237 to store the received packets until all the packets are received successfully, and then the buffer may forward the received packets in the correct order (which may not necessarily be the order of their arrival) to a client 238. Additionally or alternatively, the retransmission module 236 may use the buffer 237 to store the received packets for a short period until it is possible to forward them to the client 238.

The sizes of the buffers (205, 237) used by the retransmission module may be limited in order to save cost. In one example, the buffer 205 of the second transceiver 201 can store up to 20 microseconds of traffic sent at the highest communication rate. In another example, the first transceiver 200 forwards the packets to the client 238 in the correct order, and buffer 237 can store up to 30 microseconds of traffic sent at the highest communication rate. In still another example, at least one of the buffers used by the first and second transceivers can store up to 100 microseconds of traffic sent at the highest communication rate.

Upon detecting a new serious interference, the first transceiver 200 utilizes a fast-adaptive mode-conversion canceller (FA-MCC 232) to generate a compensation signal to cancel the differential interference caused by mode-conversion of the common mode signal. Optionally, until the interference is cancelled, the second transceiver 201 retransmits lost packets. The FA-MCC may not have information regarding the properties of the interference in advanced, and thus the FA-MCC may use a large adaptation step size that enables rapid convergence. Although the actual size of the large adaptation step size depends on the specific implementation, a person skilled in the art should be able to calculate the values of the large adaptation step sizes to support convergence time that is short enough for the communication system to meet its design goals and/or real-time requirements. One example of a design goal is not to exceed the limited capacity of one or more of the buffers 205 and 237 used by the retransmission module. One example of a real-time requirement is not to exceed the maximum permitted delay allocated to the communication channel. As a result of the large adaptation step size, the convergence of the FA-MCC 232 after a serious interference may not be optimal.

In one example, the serious interference causes the packet loss to exceed 50% at the first transceiver 200, and the FA-MCC 232 is designed to converge within less than 20 microseconds to a level that reduces the packet loss at the first transceiver 200 to less than 5%. Optionally, the packet loss is calculated as the number of the lost packets divided by the number of the sent packets.

In another example, the serious interference causes the packet loss to exceed 10% at the first transceiver 200, and the FA-MCC 232 is configured to converge within less than 10 microseconds to a level that reduces the packet loss at the first transceiver 200 to less than 1%.

In still another example, the serious interference causes packet loss to exceed 2% at the first transceiver 200, and the FA-MCC 232 is configured to converge within less than 20 microseconds to a level that reduces the packet loss at the first transceiver 200 to less than 0.1%.

In one embodiment, the communication channel is relatively short (for example, shorter than 10 meters, or shorter than 3 meters) and thus is not considered difficult. In such a channel, the communication system can operate well enough with the non-optimal convergence of the FA-MCC because the leftover interference that was not cancelled does not prevent successful communication over the channel.

Element 225, which may be referred to as a digital canceller, may be implemented in various ways. FIG. 2B illustrates one example in which element 225 includes at least an equalizer 224 and a Decision-Based Filter (DBF) 228. The term "equalizer", such as equalizer 224, may be a Feed Forward Equalizer (FFE). The term "Decision-Based Filter", such as DBF 228, refers to a filter fed at least by a slicer's output, such as slicing results and/or slicing errors. In one example, the DBF includes a non-adaptive Decision Feedback Equalizer (DFE), or a non-adaptive FEXT canceller, fed by the slicing results. In another example, the DBF includes an adaptive DFE, or an adaptive FEXT canceller, fed by the slicing results and/or the slicing errors.

In still another example, the DBF includes an adaptive Feed-Forward Equalizer (FFE) fed by the slicing errors for adaptation purpose.

The term "slicer" and/or "slicer function", such as slicer 226, is defined as a one or more dimensional quantizer that outputs the quantization result. Optionally, the slicer may include different slicers for different modulations. Optionally, the slicer may output one or more of the following indications: an indication of the error between the received signal and the quantization result, an indication of the slicer function used for producing the slicing result, an indication of the direction of the slicing error, and/or other indications.

The slicing results are fed to a Physical Coding Sublayer (PCS), such as PCS 234, which parses the data packets and extracts information such as a packet header, a packet payload, a packet tail, and/or an error detection code. It is noted that herein an "error detection code" may also be used to refer to an "error correction code".

In one embodiment, the retransmission module 236 receives the parsed packets from the PCS 234, and based on the received parsed packets it may request retransmission of the packets with errors. Optionally, to facilitate proper cooperation between the FA-MCC 232 and the retransmission module 236, while limiting the manufacturing cost, the buffer 237 is large enough to store packets that are received until the FA-MCC 232 cancels the effect of the serious interference. Optionally, the combination of the FA-MCC 232 and the retransmission module 236 enables the system to utilize small retransmission buffers also when operating over a communication channel that is not completely known and may suffer from serious common-mode-to-differential-mode interferences. For example, the capacity of buffer 237 may be below the smaller of: (i) a capacity below two times the capacity needed to store packets that are received until the FA-MCC 232 cancels the effect of the serious interference, and (i) the amount of data transmitted over 1 ms using the highest throughput.

Referring back to FIG. 2A that illustrates one embodiment of a communication system operating over a differential communication channel that is not completely known and may suffer from serious common-mode-to-differential-mode interferences. The illustrated communication system includes a first transceiver 260 and a second transceiver 262, which are capable of communicating at a high throughput, with communication rates possibly exceeding 100 Mbps, 1 Gbps, or 10 Gbps. The first transceiver 260 is implemented on an integrated circuit (IC) having limited resources. The first transceiver 260 includes at least first and second AFEs (222, 230) coupled to the second transceiver 262 over a differential communication channel 210 that is not completely known. From time to time, the differential communication channel may suffer from serious interferences that prevent normal operation. The CMS-AFE 230 extracts a digital representation of a common mode signal of the received differential signal, and forwards it to a fast-adaptive mode-conversion canceller (FA-MCC 232) that generates a compensation signal to mitigate the differential interference caused by mode-conversion of the common mode signal. The FA-MCC 232 may utilize a large adaptation step size to mitigate the effect of the serious interference fast. In one example, the large adaptation step size enables it to mitigate, within less than 20 microseconds, the effect of the serious common-mode-to-differential-mode interference, and bring it to a level that enables normal operation. Element 225 feeds a slicer 226 that feeds a PCS 234 with quantization results. The PCS 234 extracts packet data from the quantization results and drives a retransmission module 270 that requests retransmission of the packets with errors based on the packet data. In one embodiment, the retransmission module 270 is limited to support retransmission of up to 200% of the packets received during the time it takes the FA-MCC 232 to mitigate the effect of the serious interference.

Optionally, the retransmission module 270 is implemented on the IC with limited resources, which cannot support retransmission of more than 200% of the packets received during the time it takes the FA-MCC 232 to mitigate the effect of the serious interference. Optionally, the retransmission module includes a retransmission buffer 271 able to store up to 200% of the packets received during the time it takes the FA-MCC 232 to mitigate the effect of the serious interference. Additionally or alternatively, the retransmission module 270 is limited to support retransmission of up to 200% of the packets received during the time it takes the FA-MCC 232 to mitigate the effect of the serious interference in order to achieve one or more of the following requirements: a maximum allowed jitter, a maximum amount of dropped packets, and requirements related to time sensitive data transmitted over the communication channel.

In one example, the retransmission module 270 further comprises a buffer to store the received packets until all packets are received successfully. Additionally or alternatively, the size of the buffer may be limited to store the amount of packets that are received during up to 20 microseconds of normal operation. Additionally or alternatively, the retransmission module 270 further includes a buffer 271 to store the received packets until they are requested by a client 274. In another example, the packet data includes information related to a packet header, a packet payload, a packet tail, and/or an error detection code. Additionally or alternatively, the FA-MCC 232 may not converge optimally, and therefore, it may not reach an optimal solution even after 1 second. Additionally or alternatively, the digital canceller 225 may include an equalizer 224 and a Decision-Based Filter (DBF 228). Additionally or alternatively, the equalizer 224 may be a Feed Forward Equalizer (FFE). Additionally or alternatively, the DBF 228 may be a filter fed by an output of the slicer 226.

In some embodiments, upon detecting a serious interference, the communication system reduces the code rate until the FA-MCC mitigates the effect of the serious interference. After the FA-MCC mitigates the effect of the serious interference, the communication system increases the code rate, optionally until returning to the code rate used before the serious interference was detected. Reducing the code rate improves the packets' robustness to noise, and thus enables a transceiver to receive at least some of the packets successfully. Reducing the code rate may be implemented in addition to utilization of the retransmission module described above.

The code rate may be reduced by various techniques such as Dynamic Modulation Coding (DMC), adding Error Correction Code (ECC), and/or transmitting a known sequence (that reduces the code rate to practically zero). In one embodiment, the code rate is reduced by decreasing the modulation order using Dynamic Modulation Coding (DMC). DMC is described, for example, in U.S. Pat. No. 8,565,337, titled "Devices for transmitting digital video and data over the same wires", which is incorporated herein by reference in its entirety. In one example, upon detecting a serious interference, a Pulse-Amplitude Modulation (PAM) transceiver may switch from using PAM16 to PAM4 until the FA-MCC mitigates the effect of the serious interference, and then switch from PAM4 to PAM8, and from PAM8 back to PAM16 when the channel properties allow. In another embodiment, the code rate is reduced by adding ECC, either by adding ECC when there was no ECC, or by increasing the amount of the ECC overhead in order to improve the Signal to Noise Ratio (SNR). For example, the ECC may be added by continually adding ECC overhead to the stream, optionally in a similar manner to convolutional codes. Additionally or alternatively, the ECC may be strengthened by adding the ECC overhead to fixed length data segments, optionally in a similar manner to block codes.

In still another embodiment, the code rate is reduced to practically zero by transmitting a known sequence. The known sequence may be based on the scrambler sequence, such as transmitting the scrambler, or transmitting bitwise complement code words of the scrambler. Additionally or alternatively, the known sequence may be based on the idle sequence, such as transmitting the idle sequence, or transmitting bitwise complement code words of the idle sequence. One example of a transmitter that transmits bitwise complement code words of the idle sequence includes an encoder that encodes a first frame, a basic idle sequence, and a second frame; where the first frame, the basic idle sequence, and the second frame include code words. The transmitter may further include an idle sequence modifier that produces an idle sequence by replacing certain M code words of the basic idle sequence with M bitwise complement code words (where, optionally, each bitwise complement code word appears in the basic idle sequence). Bitwise complement, also known as bitwise NOT, applies logical negation on each bit, forming the ones' complement of a given binary value. For unsigned integers, the bitwise complement of a number is the mirror reflection of the number across essentially the half-way point of the unsigned integer's range.

Figure 3A:
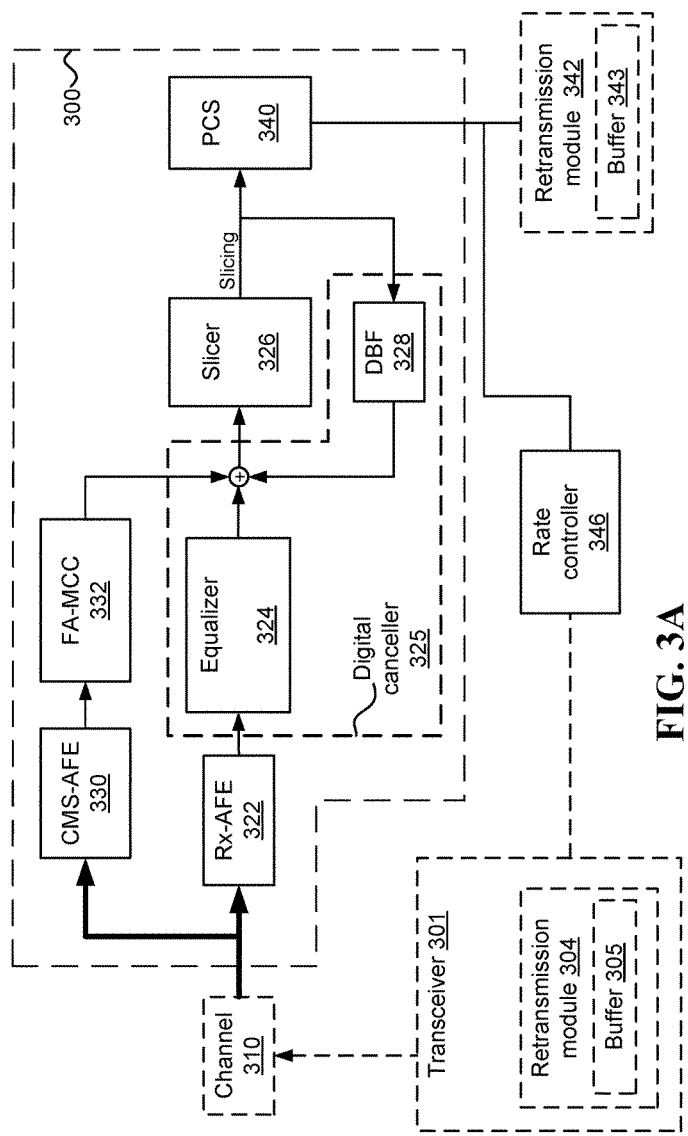
FIG. 3A illustrates still another embodiment of a communication system operating over a differential communication channel that may suffer from serious common-mode-to-differential-mode interferences.

FIG. 3A illustrates one embodiment of a communication system operating over a differential communication channel 310 that is not completely known and may suffer from serious common-mode-to-differential-mode interferences. The communication system includes a first transceiver 300 and a second transceiver 301, which are capable of communicating at a high throughput, with communication rates possibly exceeding 100 Mbps, 1 Gbps, or 10 Gbps. The communication system may be implemented, at least in part, on one or more Integrated Circuits (ICs) having limited resources. In one embodiment, the second transceiver 301 utilizes a retransmission module 304 that uses a buffer 305 to store the packets that may have to be retransmitted. In one embodiment, the first transceiver 300 utilizes a retransmission module 342 that uses a buffer 343 to store the received packets until all the packets are received successfully. In one embodiment, the sizes of the buffers (305, 343) used by the retransmission modules may be limited in order to save cost. In one example, the buffer 305 of the second transceiver 301 can store up to 20 microseconds of traffic sent at the highest communication rate. In another example, the first transceiver 300 forwards the packets in the correct order and the buffer 343 can store up to 30 microseconds of traffic sent at the highest communication rate. In still another example, at least one of the buffers (305, 343) can store up to 100 microseconds of traffic sent at the highest communication rate.

Upon detecting a new serious interference, the FA-MCC 332 may utilize a large adaptation step size to mitigate the effect of the serious interference fast. Until the effect of the interference is brought to a desired level, the rate controller 346 may reduce the rate of transmission of the packets in order to improve the packets' robustness to noise.

Optionally, in response to receiving an indication from the PCS 340 about the serious interference, the rate controller 346 commands the second transceiver 301 to reduce its code rate, and updates the first transceiver 300 about the reduction in the code rate. In response to receiving a further indication from the PCS 340 that the FA-MCC 332 successfully mitigated the effect of the serious interference, the rate controller 346 commands the second transceiver 301 to increase its code rate, and updates the first transceiver 300 about the increment in the code rate. The indication from the PCS 340 to the rate controller 346 may be a function of one or more of the following values: the percent of lost packets, the rate of lost packets, a function of the lost and successfully received packets, a score proportional to the detected interference, a score proportional to a slicing error provided by the slicer 326, and/or a score proportional to the number of errors detected by the PCS 340.

In one example, the command from the rate controller 346 to the first transceiver 300 about the reduction in the code rate causes the slicer 326 to change its slicer function to a slicing function suitable for the reduced code rate. Optionally, the rate controller 346 and/or the retransmission module 342 may be implemented as part of first transceiver 300, and/or may be implemented as a hardware module/s coupled to the first transceiver 300.

Upon detecting that the effect of the serious interference has been mitigated by the FA-MCC 332, the rate controller 346 increases the code rate of transmitting the packets. In one embodiment, at least one of the packets, which could not be sent due to insufficient bandwidth while the code rate was reduced, is discarded without attempting a delayed transmission or retransmission. In one example, the traffic transmitted over the communication channel 310 includes video pixel data that is discarded during the time in which the systems uses the lower code rate. In another embodiment, at least some of the packets that could not be sent while the code rate was reduced, are stored, optionally in the buffer 305 at the second transceiver 301, and transmitted after the code rate is restored to a level that permits transmission of the extra data. In one example, the traffic transmitted over the communication channel 310 includes time sensitive data (e.g., video synchronization data) and time insensitive data (e.g., Ethernet data). While operating in the lower code rate, the system may continue to transmit the time sensitive data, and to store the time insensitive data, optionally in buffer 305. After mitigating the effects of the interference and restoring the code rate to a level that supports a higher bandwidth, the system transmits the stored time insensitive data in parallel to transmitting the ongoing data.

In one example, the command from the rate controller 346 to the first transceiver 300 about increasing the code rate causes the slicer 326 to change its slicer function to one suitable for the higher code rate.

In one embodiment, the convergence of the FA-MCC 332 after a serious interference is not optimal because an optimal convergence may not be attainable fast enough. In one example, the serious interference causes packet loss to exceed 50% at the first transceiver 300, and the FA-MCC 332 converges within less than 20 microseconds to a level that reduces the packet loss at the first transceiver 300 to less than 5%. In another example, the serious interference causes packet loss to exceed 10% at the first transceiver 300, and the FA-MCC 332 converges within less than 10 microseconds to a level that reduces the packet loss at the first transceiver 300 to less than 1%. In still another example, the serious interference causes packet loss to exceed 2% at the first transceiver 300, and the FA-MCC 332 converges within less than 20 microseconds to a level that reduces the packet loss at the first transceiver 300 to less than 0.1%.

The digital canceller 325 may be implemented in various ways. FIG. 3A illustrates one example in which the digital canceller 325 includes at least an equalizer 324 and a DBF 328. In one example, the equalizer 324 and/or the DBF 328 may have different functions for the different data rates. Using different function for different data rates is described, for example, in U.S. Pat. No. 8,930,795, titled "Methods for slicing dynamically modulated symbols", which is incorporated herein by reference in its entirety. In one example, the slicing results are fed to the PCS 340, which parses the data packets and extracts information such as a packet header, a packet payload, a packet tail, and packet modulation information. The PCS 340 determines the modulation used by the second transceiver 301, and provides the slicer 236 an indication of which slicing function to use. The slicer 326 may then feed the DBF 328 with the slicing results from using the indicated slicing function. Optionally, the slicer 326 may additionally provide slicing errors associated with the slicing results. Following that, the DBF 328 generates the appropriate output and adds it to the incoming signal from the equalizer 324.

In one embodiment, the first transceiver 300 includes an optional retransmission module 342 that receives the parsed packets from the PCS 340, and based on the received parsed packets, it may request retransmission of the packets with errors. In one embodiment, to facilitate proper cooperation between the FA-MCC 332 and the retransmission module 342, the buffer 343 utilized by the retransmission module 342 is large enough to store the arriving packets until the FA-MCC 332 mitigates the effect of the serious interference. The combination of the fast converging FA-MCC 332 and the retransmission module 342 enables both transceivers to use small retransmission buffers (343 and 305) also when operating over a communication channel that is not completely known and may suffer from serious common-mode-to-differential-mode interference.

As a result of reducing the code rate, some of the packets may not be transmitted even once because the effective communication bandwidth is reduced. These packets may be stored in the retransmission buffer 305 at the second transceiver 301, which has to be large enough to store the packets that cannot be transmitted as long as the system operates at the lower code rate (typically until the effect of the serious common-mode-to-differential-mode interference is mitigated and brought to a sufficient level).

Figure 3B:
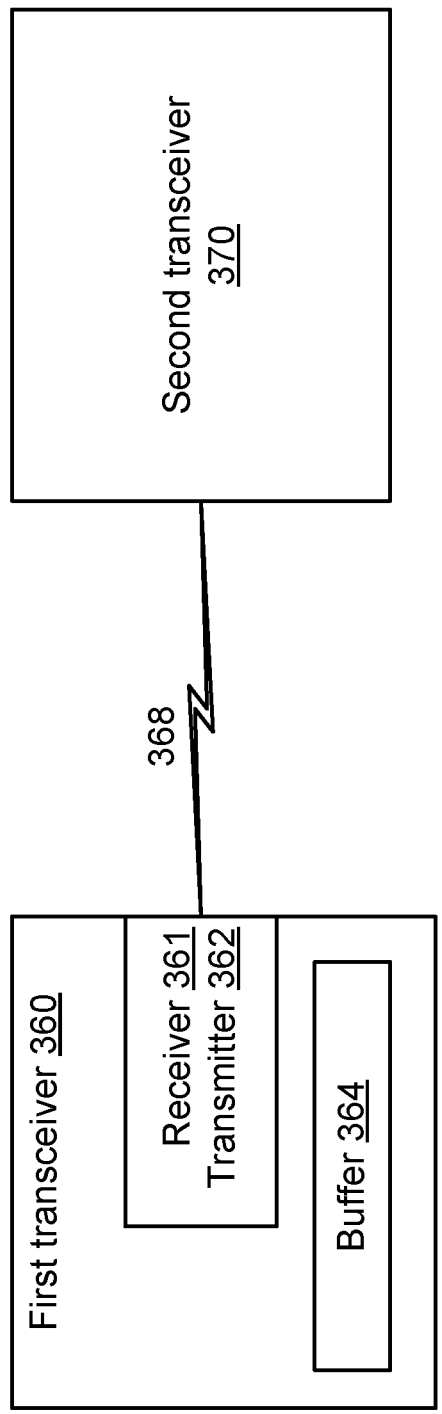
FIG. 3B illustrates a first transceiver that assists a second transceiver to recover rapidly from a serious interference.

FIG. 3B illustrates a first transceiver 360 that assists a second transceiver 370 to recover rapidly from a serious interference. The first transceiver 360 includes a receiver 361, a transmitter 362, and a buffer 364. The transmitter 361 transmits data to the second transceiver 370, over a differential communication channel 368, at a fixed data rate above 100 Mbps. Responsive to receiving an indication, by the receiver 361 from the second transceiver 370, that the second transceiver 370 is experiencing a serious interference, the transmitter 362 reduces the data rate at which it transmits data to the second transceiver 370. Optionally, reducing the data rate improves the signal to noise ratio at the second transceiver 370, which enables the second transceiver 370 to recover from the serious interference within less than 1 millisecond. The buffer 364 is configured to store excess data that could not be transmitted by the transmitter 362 while the data rate was reduced. And the transmitter 362 increases its data rate to a level that enables it to transmit, within less than 1 millisecond from the moment of reducing the data rate, both the stored excess data and the ongoing data at the fixed data rate.

Optionally, the first transceiver 360 transmits at a fixed data rate above 1 Gbps. Additionally or alternatively, more than 80% of the fixed data rate is utilized to transmit at least one of the following: uncompressed video, and lightly compressed video below 4:1 compression ratio. Optionally, the serious interference is a serious common-mode-to-differential-mode interference. Optionally, the first transceiver 360 is implemented, at least in part, on an Integrated Circuits (IC) having limited resources, and the buffer 364 has a capacity sufficient to store up to 100 microseconds of traffic transmitted at the highest communication rate. Optionally, the first transceiver 360 receives from the second transceiver an indication to increase the data rate. And optionally, the fixed data rate refers to less than 2% difference between the following values: (i) a first amount of unique data successfully transmitted over the differential communication channel during a first 2-millisecond window that ends 100 microseconds before the serious interference, and (ii) a second amount of unique data successfully transmitted over the differential communication channel during a second 2-millisecond window adjacent to the first window.

In one embodiment, a method for rapidly recovering from a serious interference includes the following steps: In step 1, transmitting, by a transmitter to a transceiver over a differential communication channel, at a fixed data rate above 100 Mbps. In step 2, receiving, by a receiver from the transceiver, an indication indicating that the transceiver is experiencing the serious interference. In step 3, responsive to the indication, reducing the data rate at which the transmitter transmits. Where the reduced data rate improves the signal to noise ratio at the transceiver, which enables the transceiver to recover from the serious interference within less than 1 millisecond. In step 4, storing excess data that could not be sent during the period of the reduced data rate. And in step 5, increasing the data rate, at which the transmitter transmits, to a level that enables it to transmit, within less than 1 millisecond from the moment of reducing the data rate, both the stored excess data and the ongoing data at the fixed data rate.

Optionally, the method further includes the step of receiving from the transceiver an indication to increase the data rate. Optionally, the serious interference is a serious common-mode-to-differential-mode interference.

In one embodiment, such as the embodiment illustrated in FIG. 3A, a transceiver that utilizes dynamic coding for rapid recovery, includes: a digital canceller coupled to a receiver analog front end (Rx-AFE) and to a common mode sensor AFE (CMS-AFE) via a fast-adaptive mode-conversion canceller (FA-MCC). The Rx-AFE and CMS-AFE are coupled to a differential communication channel that is coupled to a second transceiver. Responsive to receiving an indication that a serious differential interference has occurred, a rate controller commands the second transceiver to reduce the code rate of the packets by at least 50% and to update the FA-MCC about the reduction in the code rate. Responsive to being apprised about the reduction, the FA-MCC increases its adaptation step size (ADSS) by at least 50% in order to mitigate, within less than 1 millisecond, the effect of the serious differential interference. Following mitigation of the effect of the serious differential interference, the rate controller: commands the second transceiver to increase the code rate, and updates the FA-MCC about the increase in the code rate. And after mitigating the effect of the serious differential interference, the FA-MCC may reduce its ADSS.

Optionally, the FA-MCC mitigates the effect of the serious differential interference within less than 100 microseconds. Additionally or alternatively, the FA-MCC utilizes a large ADSS that enables mitigation, within less than 20 microseconds, of the effect of the serious differential interference and enables restoration of the transceiver's packet loss rate to the first packet loss rate. Optionally, the FA-MCC is further configured to reduce the ADSS, by at least 50%, within 10 milliseconds from the time of increasing the code rate. Additionally or alternatively, the FA-MCC is further configured to reduce the ADSS, by at least 50%, within 1 second from the time of increasing the code rate.

Optionally, the parameters of the differential communication channel are not completely known, and the transceiver is expected to work at a first packet loss rate (which is feasible when there is no serious differential interference). From time to time, the differential communication channel may suffer from serious differential interferences that increase the packet loss rate of the transceiver to a second packet loss rate that is at least ten times the first packet loss rate. Additionally, mitigating the effect of a serious differential interference may cause the transceiver to return to the first packet loss rate. Optionally, the rate controller commands the second transceiver to further increase the code rate until the second transceiver returns to the code rate used before the serious differential interference was detected.

Optionally, the digital canceller feeds a slicer that feeds a Physical Coding Sublayer (PCS) with quantization results; and the PCS extracts the packets from the quantization results. Additionally or alternatively, rate controller may update the digital canceller and the slicer about the reduction in the code rate; and following mitigation of the effect of the serious differential interference, the rate controller updates the digital canceller and the slicer about the increase in the code rate. The embodiment may further include a retransmission module configured to request retransmission of packets with errors, based on the packets extracted by the PCS. Optionally, the FA-MCC mitigates the effect of the serious differential interference within less than 500 microseconds, and the retransmission module is limited to support retransmission of up to 100% of the packets received during the 500 microseconds. Optionally, the indication that the serious differential interference has occurred is based on one or more of the following values received from the PCS: a percent of lost packets, a rate of lost packets, a function of lost and successfully received packets, a score proportional to the detected differential interference, a score proportional to slicing error provided by the slicer, and a score proportional to number of errors detected by the PCS. Optionally, the update of the slicer by the rate controller comprises an indication to the slicer to change its slicer function to a slicing function suitable for the reduced code rate.

Additionally or alternatively, at least some of the packets that could not be sent while the rate was reduced, are stored in a buffer at the second transceiver, and transmitted after the rate is restored to a level that permits transmission of the stored data in parallel to the ongoing transmission. Additionally or alternatively, the traffic transmitted over the differential communication channel comprises time sensitive data and time insensitive data, and while operating in the lower code rate, the second transceiver transmits the time sensitive data, and stores the time insensitive data in a buffer. Optionally, after mitigating the effect of the serious differential interference and restoring the code rate to a level having higher bandwidth, the second transceiver is further configured to transmit the time sensitive data stored in the buffer before transmitting the time insensitive data stored in the buffer.

Optionally, the rate controller commands the second transceiver to reduce the code rate of the packets by at least 90%. Optionally, the transceiver and the second transceiver utilize Dynamic Modulation Coding in order to reduce the code rate. Optionally, the packets are modulated using Pulse-Amplitude Modulation (PAM), and the rate controller commands the second transceiver to switch from using PAM16 to PAM4 until the FA-MCC mitigates the effect of the serious differential interference. Optionally, the code rate is reduced by adding Error Correction Code to the packets. Additionally or alternatively, at least one of the packets, which could not be sent due to insufficient bandwidth while the code rate was reduced, is discarded without attempting a delayed transmission or retransmission. Optionally, the packets carry video data, and the at least one discarded packet comprises video pixel data and does not include video control data.

In one embodiment, a method for achieving rapid recovery from a serious differential interference utilizing dynamic coding includes the following steps: In step 1, responsive to receiving an indication that a first transceiver suffers from a serious differential interference, commanding a second transceiver to reduce, by at least 50%, the code rate of packets sent to the first transceiver. In step 2, responsive to receiving, by a fast-adaptive mode-conversion canceller (FA-MCC) comprised in the first transceiver, an indication about the reduction in the code rate, increasing the adaptation step size (ADSS) of the FA-MCC by at least 50%; wherein increasing the ADSS enables the FA-MCC to mitigate within less than 1 millisecond the effect of the serious differential interference. In step 3, following mitigation of the effect of the serious differential interference: commanding the second transceiver to increase the code rate, and updating the FA-MCC about the increase in the code rate. And in step 4, reducing the ADSS of the FA-MCC after mitigation of the effect of the serious differential interference.

The method may further include the step of commanding the second transceiver to further increase the code rate until returning to the code rate used before the serious differential interference was detected. Optionally, the FA-MCC utilizes a large ADSS that enables it, within less than 100 microseconds, to mitigate the effect of the serious differential interference and to restore the transceiver's packet loss rate to the first packet loss rate (which is feasible when there is no serious differential interference). Optionally, the FA-MCC reduces the ADSS, by at least 50%, within 10 milliseconds from the time of increasing the code rate. And optionally, the indication that the first transceiver suffers from a serious differential interference is based on one or more of the following values received from a Physical Coding Sublayer (PCS) comprised in the first transceiver: a percent of lost packets, a rate of lost packets, a function of lost and successfully received packets, a score proportional to the detected differential interference, a score proportional to slicing error provided by the slicer, and a score proportional to number of errors detected by the PCS.

In one embodiment, a transceiver receives an indication from its link partner that the partner is at a bad operating point. As a result, the transceiver starts to transmit first known data for at least a first predefined minimum period, and then transmits a signal that indicates that its receiver (the receiver of the transmitter) is at a good operating point. The link partner is configured to operate in a similar manner when the link partner receives an indication from the transceiver that the transceiver is at a bad operating point. The link partner starts to transmit second known data for at least a second predefined minimum period, and then transmits a signal that indicates that its receiver (the receiver of the link partner) is at a good operating point.

Figure 4:
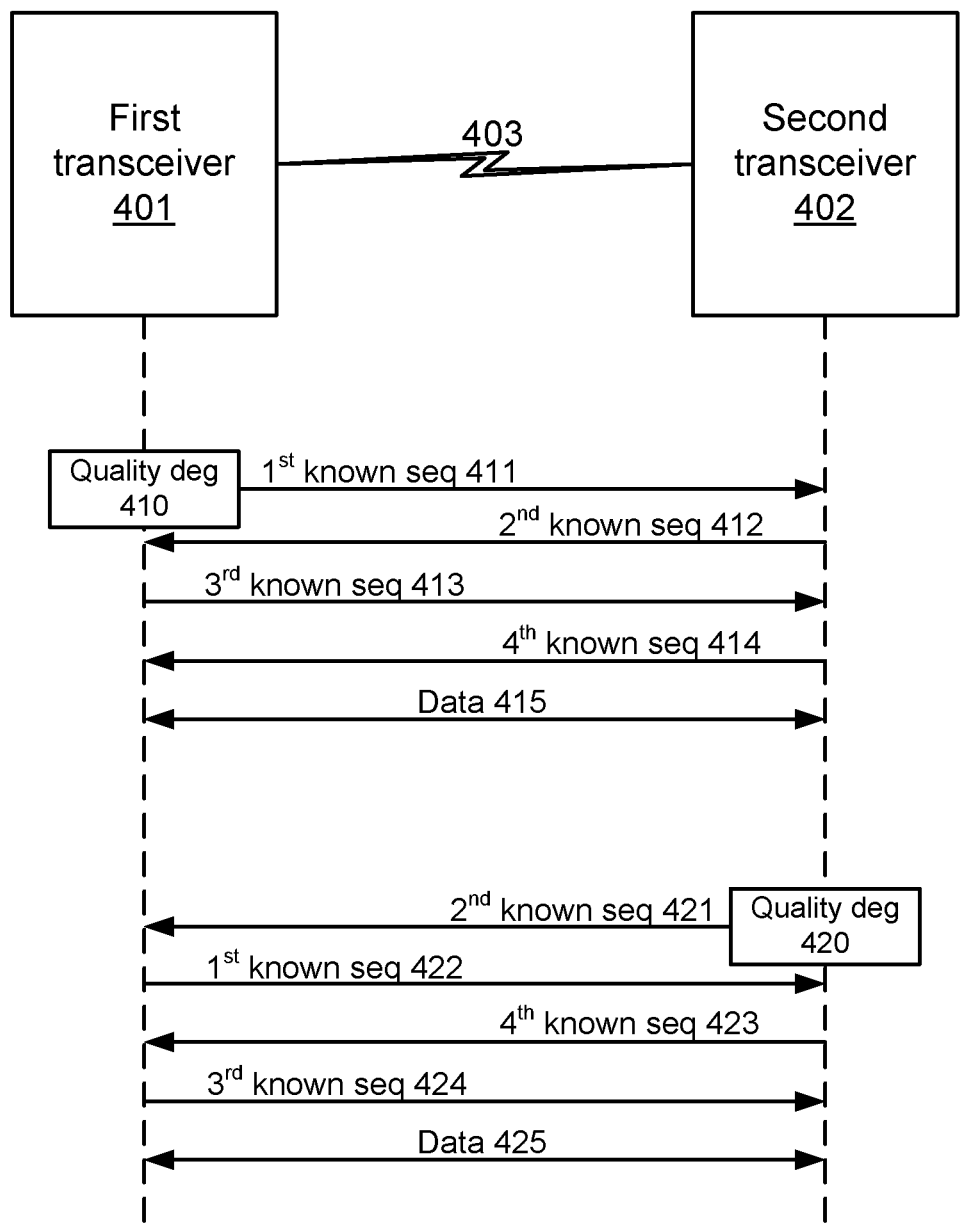
FIG. 4 illustrates a communication system that utilizes transmissions of known sequences to indicate quality of operating points.

FIG. 4 illustrates a communication system that utilizes transmissions of known sequences to indicate quality of operating points. The system includes a first transceiver 401 and a second transceiver 402, which communicate over a communication channel 403. Responsive to identifying a quality degradation in the operating point it is at, the first transceiver 401 transmits a $1^{st}$ known sequence, for a $1^{st}$ duration. Then, responsive to receiving the $1^{st}$ known sequence, the second transceiver 402 replies with a $2^{nd}$ known sequence, for a $2^{nd}$ duration, responsive to receiving the $1^{st}$ known sequence; wherein each of the $1^1$ and $2^{nd}$ durations is longer than the round trip delay between the first and second transceivers. And responsive to identifying a quality degradation in the operating point of the second transceiver 402, the second transceiver 402 transmits the $2^{nd}$ known sequence for the $2^{nd}$ duration, and then the first transceiver 401 replies with the $1^{st}$ known sequence for the $1^{st}$ duration.

The communication system may feature various options. Optionally, the first transceiver utilizes the $2^{nd}$ known sequence to recover from its quality degradation faster than it could recover without receiving the $2^{nd}$ known sequence. Additionally, the second transceiver may utilize the $1^{st}$ known sequence to recover from its quality degradation faster than it could recover without receiving the $1^{st}$ known sequence. According to another option, the first and second transceivers utilize the $1^{st}$ and $2^{nd}$ known sequences, respectively, to recover from their quality degradations within less than 1 millisecond from the occurrence of the quality degradations. In one example, the meaning of recovering from a quality degradation is that the communication system is able to successfully exchange data according to its expected performance. According to still another option, the first and second transceivers utilize the $1^{st}$ and $2^{nd}$ known sequences, respectively, to recover from their quality degradations within less than 50 microseconds from the occurrence of the quality degradations.

Optionally, the first transceiver transmits a $3^{rd}$ known sequence after recovering from its quality degradation, and the second transceiver transmits a $4^{th}$ known sequence after recovering from its quality degradation. Optionally, the $1^{st}$, $2^{nd}$ $3^{rd}$, and $4^{th}$ known sequences are different. Additionally, the first and second transceivers may include first and second scramblers, respectively; the first scrambler is known to the second transceiver, the second scrambler is known to the first transceiver, and the $1^{st}$, $2^{nd}$, $3^{rd}$, and $4^{th}$ known sequences are based on the scramblers. Additionally or alternatively, the $1^{st}$ and $2^{nd}$ known sequences may be bitwise-complement-code-words of the idle sequences sent by the first and second transceivers, respectively, and each bitwise-complement-code-word may appear in the idle sequence. Optionally, the $3^{rd}$ and $4^{th}$ known sequences are the idle sequences sent by the first and second transceivers, respectively. And according to another option, the second transceiver starts transmitting data only after receiving the $3^{rd}$ known sequence, and the first transceiver starts transmitting data only after receiving the $4^{th}$ known sequence.

Optionally, the duration from identifying the quality degradation in the operating point of the first transceiver to the initiation of the transmission of the $1^{st}$ known sequence is shorter than the duration required for the first transceiver to send a nominal data packet. Additionally, the first transceiver may initiate the transmission of the $1^{st}$ known sequence in the middle of transmitting a data packet. According to another option, the duration from receiving the $1^{st}$ known sequence to the initiation of the transmission of the $2^{nd}$ known sequence is shorter than the duration required for the second transceiver to send a nominal data packet. Additionally, the second transceiver may initiate the transmission of the $2^{nd}$ known sequence in the middle of transmitting a data packet.

Optionally, the $1^{st}$ and $2^{nd}$ durations are predetermined and equal. Optionally, both the $1^{st}$ and $2^{nd}$ durations are longer than 0.1 microseconds and shorter than 500 microseconds. And optionally, both the $1^{st}$ and $2^{nd}$ durations are longer than 0.1 microseconds and shorter than 20 microseconds.

In one example, the quality degradations result from mode-conversion of common mode signals; and while suffering from the quality degradations, the first and second transceivers do not meet their expected performances. In this example, the quality degradation in the operating point of the first transceiver may result from a mode-conversion of a common mode signal, and while suffering from the quality degradation the first transceiver does not meet its expected performance. Additionally or alternatively, the quality degradation in the operating point of the second transceiver may result from a mode-conversion of a common mode signal, and while suffering from the quality degradation the second transceiver does not meet its expected performance.

The communication system may further include a retransmission module to request transmission of packets that could not be transmitted while at least one of the first and second transceivers have not recovered from their quality degradations. And optionally, the first and second transceivers communicate over a differential communication channel that transmits data at a rate above 500 Mbps.

In one embodiment, a method for utilizing transmission of known sequences to indicate qualities of operating points of first and second transceivers that communicate over a communication channel includes the following steps: In step 1, transmitting, by the first transceiver upon identifying a quality degradation in its operating point, a $1^{st}$ known sequence for a $1^{st}$ duration. In step 2, replying, by the second transceiver upon receiving the $1^{st}$ known sequence, with a $2^{nd}$ known sequence for a $2^{nd}$ duration; wherein each of the $1^{st}$ and $2^{nd}$ durations is longer than the round trip delay between the first and second transceivers. And in step 3, transmitting, by the second transceiver upon identifying a quality degradation in its operating point, the $2^{nd}$ known sequence for the $2^{nd}$ duration, and replying, by the first transceiver, with the $1^{st}$ known sequence for the $1^{st}$ duration.

The method optionally further includes the step of transmitting, by the first transceiver, a $3^{rd}$ known sequence after recovering from its quality degradation, and transmitting, by the second transceiver, a $4^{th}$ known sequence after recovering from its quality degradation. Optionally, the method further includes the step of transmitting data, by the second transceiver, only after receiving the $3^{rd}$ known sequence, and transmitting data, by the first transceiver, only after receiving the $4^{th}$ known sequence.

The method may optionally include the following step of utilizing, by the first transceiver, the $2^{nd}$ known sequence for recovering from its quality degradation faster than it could recover without receiving the $2^{nd}$ known sequence. Additionally or alternatively, the method further includes utilizing, by the second transceiver, the $1^{st}$ known sequence for recovering from its quality degradation faster than it could recover without receiving the $1^{st}$ known sequence. Optionally, the method further includes the step of utilizing, by the first and second transceivers the $1^{st}$ and $2^{nd}$ known sequences, respectively, for recovering from their quality degradations within less than 1 millisecond from the occurrence of the quality degradations. According to another option, the method further includes the step of utilizing, by the first and second transceivers, the $1^{st}$ and $2^{nd}$ known sequences, respectively, for recovering from their quality degradations within less than 50 microseconds from the occurrence of the quality degradations.

In one example, the duration from identifying the quality degradation in the operating point of the first transceiver to start transmitting the $1^{st}$ known sequence is shorter than the duration required for the first transceiver to send a packet. And optionally, the method further includes the step of transmitting packets that could not be transmitted while at least one of the first and second transceivers have not recovered from their quality degradations.

The elements used by the embodiments may be implemented in various ways. The analog front ends (such as the Rx-AFE, Tx-AFE, and CMS-AFE) may be implemented using analog elements and/or analog and digital elements. The buffers are implemented using memory to store the data, and processor to access the data over a communication channel, such as a parallel bus or a serial bus. Elements such as digital cancellers, equalizers, DBFs, FA-MCC, ADEC, DEDC, slicers, selectors, error generators, scramblers, PCS, link layer modules, retransmission modules, controllers, and/or rate controllers may be implemented utilizing a combination that includes one or more of the following hardware, firmware, and software elements: ASIC, FPGA, processors, memory blocks, discrete circuits, integrated circuits, at least one processor to execute commands stored in at least one memory block, a non-transitory computer-readable medium comprising computer-executable instructions that when executed on a computing device cause the computing device to perform certain operations, a processor and a computer readable storage medium comprising a program of instructions executable by the processor wherein when the instructions are executed the processor perform certain operations, a computer system comprising one or more processing units and memory storing one or more programs configured for execution by the one or more processors units wherein the one or more programs include instructions for certain operations, a system comprising a data processing apparatus and a non-transitory computer readable medium storing instructions executable by the data processing apparatus and that upon such execution cause the data processing apparatus to perform certain operations.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A first transceiver configured to assist a second transceiver to recover rapidly from a serious interference, the first transceiver comprising:
   a receiver, a transmitter, and a buffer;
   the transmitter is configured to transmit ongoing data to the second transceiver, over a differential communication channel, at a fixed data rate above 100 Megabits Per Second (Mbps);
   the receiver is configured to receive from the second transceiver an indication indicating that the second transceiver is experiencing a serious interference;
   responsive to receiving the indication, the transmitter is configured to reduce data rate at which it transmits data to the second transceiver;
   whereby reducing the data rate improves signal to noise ratio at the second transceiver, which enables the second transceiver to recover from the serious interference within less than 1 millisecond;
   the buffer is configured to store excess data that cannot be transmitted by the transmitter while the data rate was reduced; and
   the transmitter is further configured to increase its data rate to a level that enables it to transmit, within less than 1 millisecond from the moment of reducing the data rate, both the stored excess data and the ongoing data at the fixed data rate.

2. The first transceiver of claim 1, wherein the first transceiver is configured to transmit at a fixed data rate above 1 Gigabits Per Second (Gbps), and the serious interference is a serious common-mode-to-differential-mode interference.

3. The first transceiver of claim 1, wherein the first transceiver is implemented, at least in part, on an Integrated Circuits (IC) having limited resources, and the buffer has a capacity sufficient to store up to 100 microseconds of traffic transmitted at highest communication rate of the first transceiver.

4. The first transceiver of claim 1, wherein the first transceiver is further configured to receive from the second transceiver an indication to increase the data rate.

5. The first transceiver of claim 1, wherein the fixed data rate refers to less than 2% difference between the following values: (i) a first amount of unique data successfully transmitted over the differential communication channel during a first 2-millisecond window that ends 100 microseconds before the serious interference, and (ii) a second amount of unique data successfully transmitted over the differential communication channel during a second 2-millisecond window adjacent to the first window.

6. A method for rapidly recovering from a serious interference, comprising:
   transmitting, by a transmitter to a transceiver over a differential communication channel, ongoing data at a fixed data rate above 100 Megabits Per Second (Mbps);
   receiving, by a receiver from the transceiver, an indication indicating that the transceiver is experiencing a serious interference;
   responsive to the indication, reducing data rate at which the transmitter transmits;
   wherein the reduced data rate improves the signal to noise ratio at the transceiver, which enables the transceiver to recover from the serious interference within less than 1 millisecond;
   storing excess data that cannot be sent during the period of the reduced data rate; and
   increasing the data rate, at which the transmitter transmits, to a level that enables it to transmit, within less than 1 millisecond from the moment of reducing the data rate, both the stored excess data and the ongoing data at the fixed data rate.

7. The method of claim 6, further comprising receiving from the transceiver an indication to increase the data rate.

8. A transceiver configured to utilize dynamic coding for rapid recovery, comprising:
   a digital canceller coupled to a receiver analog front end (Rx-AFE) and to a common mode sensor AFE (CMS-AFE) via a fast-adaptive mode-conversion canceller (FA-MCC);
   the Rx-AFE and CMS-AFE are coupled to a differential communication channel that is coupled to a second transceiver;
   responsive to receiving an indication that a serious differential interference has occurred, a rate controller is configured to: command the second transceiver to reduce code rate of packets by at least 50%, and update the FA-MCC about the reduction in the code rate;
   responsive to being apprised about the reduction in the code rate, the FA-MCC is configured to increase its adaptation step size (ADSS) by at least 50% in order to mitigate, within less than 1 millisecond, effect of the serious differential interference;
   following mitigation of the effect of the serious differential interference, the rate controller is configured to:

command the second transceiver to increase the code rate, and update the FA-MCC about the increase in the code rate; and the FA-MCC is further configured to reduce its ADSS after it mitigates the effect of the serious differential interference.

9. The transceiver of claim 8, wherein the FA-MCC is configured to mitigate the effect of the serious differential interference within less than 100 microseconds.

10. The transceiver of claim 8, wherein the FA-MCC is further configured to utilize a large ADSS that enables mitigation, within less than 20 microseconds, of the effect of the serious differential interference and to restore the transceiver's packet loss rate to the first packet loss rate.

11. The transceiver of claim 8, wherein the FA-MCC is further configured to reduce the ADSS, by at least 50%, within 10 milliseconds from the time of increasing the code rate.

12. The transceiver of claim 8, wherein the parameters of the differential communication channel are not completely known, and the transceiver is expected to work at a first packet loss rate when there is no serious differential interference; from time to time the differential communication channel suffers from the serious differential interferences that increase the packet loss rate of the transceiver to a second packet loss rate that is at least ten times the first packet loss rate; and cancelling the effect of the serious differential interference causes the transceiver to return to the first packet loss rate.

13. The transceiver of claim 8, wherein the rate controller is further configured to command the second transceiver to further increase the code rate until the second transceiver returns to the code rate used before the serious differential interference was detected.

14. The transceiver of claim 8, wherein the digital canceller is configured to feed a slicer that is configured to feed a Physical Coding Sublayer (PCS) with quantization results; and the PCS is configured to extract the packets from the quantization results.

15. The transceiver of claim 14, wherein the rate controller is further configured to update the digital canceller and the slicer about the reduction in the code rate; and following mitigation of the effect of the serious differential interference, the rate controller is further configured to update the digital canceller and the slicer about the increase in the code rate.

16. The transceiver of claim 14, further comprising a retransmission module configured to request retransmission of packets with errors, based on the packets extracted by the PCS; wherein the FA-MCC is configured to mitigate the effect of the serious differential interference within less than 500 microseconds, and the retransmission module is limited to support retransmission of up to 100% of the packets received during the 500 microseconds.

17. The transceiver of claim 14, wherein the indication that the serious differential interference has occurred is based on one or more of the following values received from the PCS: a percent of lost packets, a rate of lost packets, a function of lost and successfully received packets, a score proportional to the detected differential interference, a score proportional to slicing error provided by the slicer, and a score proportional to number of errors detected by the PCS.

18. The transceiver of claim 14, wherein the update of the slicer by the rate controller comprises an indication to the slicer to change its slicer function to a slicing function suitable for the reduced code rate.

19. The transceiver of claim 8, wherein the rate controller is configured to command the second transceiver to reduce the code rate of the packets by at least 90%.

20. The transceiver of claim 8, wherein the packets are modulated using Pulse-Amplitude Modulation (PAM), and the rate controller commands the second transceiver to switch from using PAM16 to PAM4 until the FA-MCC cancels the effect of the serious differential interference.

21. The transceiver of claim 8, wherein at least one of the packets, which cannot be sent due to insufficient bandwidth while the code rate was reduced, is discarded without attempting a delayed transmission or retransmission; and wherein the at least one discarded packet comprises video pixel data and does not comprise video controls.

22. A method for achieving rapid recovery utilizing dynamic coding, comprising:

responsive to receiving an indication that a first transceiver suffers from a serious differential interference, commanding a second transceiver to reduce, by at least 50%, code rate of packets sent to the first transceiver;

responsive to receiving, by a fast-adaptive mode-conversion canceller (FA-MCC) comprised in the first transceiver, an indication about the reduction in the code rate, increasing adaptation step size (ADSS) of the FA-MCC by at least 50%;

wherein increasing the ADSS enables the FA-MCC to mitigate within less than 1 millisecond effect of the serious differential interference;

following mitigation of the effect of the serious differential interference:

commanding the second transceiver to increase the code rate, and updating the FA-MCC about the increase in the code rate; and reducing the ADSS of the FA-MCC after it mitigates the effect of the serious differential interference.

23. The method of claim 22, wherein the FA-MCC utilizes a large ADSS that enables it, within less than 100 microseconds, to mitigate the effect of the serious differential interference and to restore the transceiver's packet loss rate to the first packet loss rate.

24. The method of claim 22, wherein the FA-MCC reduces the ADSS, by at least 50%, within 10 milliseconds from the time of increasing the code rate.

25. The method of claim 22, further comprising commanding the second transceiver to further increase the code rate until returning to the code rate used before the serious differential interference was detected.

26. The method of claim 22, wherein the indication that the first transceiver suffers from a serious differential interference is based on one or more of the following values received from a Physical Coding Sublayer (PCS) comprised in the first transceiver: a percent of lost packets, a rate of lost packets, a function of lost and successfully received packets, a score proportional to the detected differential interference, a score proportional to slicing error provided by a slicer, and a score proportional to number of errors detected by the PCS.

* * * * *